United States Patent
Rusanovskyy et al.

(10) Patent No.: US 10,757,385 B2
(45) Date of Patent: Aug. 25, 2020

(54) COLOR GAMUT ADAPTATION WITH FEEDBACK CHANNEL

(71) Applicant: QUALCOMM Incorporated, San Diego, CA (US)

(72) Inventors: Dmytro Rusanovskyy, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/684,732

(22) Filed: Aug. 23, 2017

(65) Prior Publication Data
US 2018/0063500 A1 Mar. 1, 2018

Related U.S. Application Data

(60) Provisional application No. 62/379,224, filed on Aug. 24, 2016.

(51) Int. Cl.
*H04N 7/12* (2006.01)
*H04N 11/02* (2006.01)
(Continued)

(52) U.S. Cl.
CPC ............ *H04N 9/67* (2013.01); *G09G 3/2003* (2013.01); *G09G 5/005* (2013.01); *G09G 5/02* (2013.01);
(Continued)

(58) Field of Classification Search
CPC ...... H04N 9/67; H04N 19/117; H04N 19/124; H04N 19/176; H04N 19/44; H04N 5/2355;
(Continued)

(56) References Cited

U.S. PATENT DOCUMENTS 9,591,257 B2 * 3/2017 Oh .................... H04N 7/0117
9,906,765 B2 * 2/2018 Qu .................... G09G 5/006
(Continued)

FOREIGN PATENT DOCUMENTS

EP 2983354 A1 2/2016

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
(Continued)

*Primary Examiner* — Trang U Tran
(74) *Attorney, Agent, or Firm* — Shumaker & Sieffert, P.A.

(57) ABSTRACT

In general, this disclosure describes techniques for communicating preferred color gamut settings from a sink device to a source device. The source device may send, through a video interface, first video data to the sink device, which receives the first video data through the video interface. The sink device may then send, through a feedback channel of the video interface, preferred color gamut settings of the sink device to the source device. The preferred color gamut settings may be for content received from the source device. The source device may adapt second video data using the preferred color gamut settings. The source device may then send, through the video interface, the second video data adapted to the preferred color gamut settings to the sink device.

30 Claims, 12 Drawing Sheets

(51) Int. Cl.

| | | |
|---|---|---|
| *H04N 11/04* | (2006.01) | |
| *H04N 9/67* | (2006.01) | |
| *H04N 21/81* | (2011.01) | |
| *H04N 21/485* | (2011.01) | |
| *H04N 21/41* | (2011.01) | |
| *H04N 21/4402* | (2011.01) | |
| *H04N 21/4363* | (2011.01) | |
| *H04N 21/658* | (2011.01) | |
| *G09G 5/00* | (2006.01) | |
| *G09G 5/04* | (2006.01) | |
| *G09G 5/02* | (2006.01) | |
| *H04N 5/235* | (2006.01) | |
| *H04N 19/117* | (2014.01) | |
| *H04N 19/124* | (2014.01) | |
| *H04N 19/176* | (2014.01) | |
| *H04N 19/44* | (2014.01) | |
| *G09G 3/20* | (2006.01) | |

(52) U.S. Cl.
CPC ............ *G09G 5/04* (2013.01); *H04N 5/2355* (2013.01); *H04N 19/117* (2014.11); *H04N 19/124* (2014.11); *H04N 19/176* (2014.11); *H04N 19/44* (2014.11); *H04N 21/4122* (2013.01); *H04N 21/43635* (2013.01); *H04N 21/4402* (2013.01); *H04N 21/4854* (2013.01); *H04N 21/6582* (2013.01); *H04N 21/816* (2013.01); *G09G 2320/066* (2013.01); *G09G 2320/0666* (2013.01); *G09G 2340/02* (2013.01); *G09G 2340/06* (2013.01); *G09G 2370/022* (2013.01); *G09G 2370/045* (2013.01); *G09G 2370/10* (2013.01)

(58) Field of Classification Search
CPC ......... H04N 21/4122; H04N 21/43635; H04N 21/4402; H04N 21/4854; H04N 21/6582; H04N 21/816; G09G 5/02; G09G 2340/06; G09G 2370/045; G09G 2370/10; G09G 3/2003
USPC ............................ 375/240.12; 348/725, 713
See application file for complete search history.

(56) References Cited

U.S. PATENT DOCUMENTS

| | | | | |
|---|---|---|---|---|
| 10,019,785 | B2 * | 7/2018 | Hsu ..................... | G06T 5/009 |
| 10,057,633 | B2 * | 8/2018 | Oh ....................... | H04N 19/46 |
| 10,097,822 | B2 * | 10/2018 | Newton ................ | G09G 5/006 |
| 2011/0074591 | A1 * | 3/2011 | Arling ................ | H04N 21/4126 |
| | | | | 340/635 |
| 2015/0243200 | A1 | 8/2015 | Pan | |
| 2016/0142714 | A1 | 5/2016 | Toma et al. | |

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.

Wang et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pp.

SMPTE Standard, "High Dynamic Range Electro-Optical Transfer Function of Mastering Reference Displays," SMPTE ST 2084:2014, The Society of Motion Picture and Television Engineers, Aug. 16, 2014, 14 pp, ISBN: 978-1-61482-829-7.

"Parameter values for the HDTV standards for production and international programme exchange," Recommendation ITU-R BT.709-6, International Telecommunication Union, Jun. 2015, 19 pp.

"Parameter values for ultra-high definition television systems for production and international programme exchange," Recommendation ITU-R BT.2020-2, International Telecommunication Union, Oct. 2015, 8 pp.

"Reference electro-optical transfer function for flat panel displays used in HDTV studio production," Recommendation ITU-R BT.1886, Mar. 2011, ITU-R Radiocommunication Sector of ITU, BT Series, Broadcasting service (television), International Telecommunication Union, Geneva, 2011, 7 pp.

Ramasubramonian et al., "Content colour volume SEI message," Joint Collaborative Team on Video Coding (JCT-VC) of ITU-T SG 16 WP 3 and ISO/IEC JTC 1/SC 29/WG 11, 24th Meeting: Geneva, CH; May 26-Jun. 1, 2016, document No. JCTVC-X0069, 4 pp.

High-Performance Single Layer Directly Standard Dynamic Range (SDR) Compatible High Dynamic Range (HDR) System for use in Consumer Electronics devices (SL-HDR1), ETSI TS 103 433 v.1.1, Aug. 2016, 84 pp.

International Search Report and Written Opinion—PCT/US2017/048414—ISA/EPO—Nov. 2, 2017, 12 pp.

"SMPTE ST 2094-10:2016: Dynamic Metadata for Color Volume Transform—Core Components," SMPTE, Sep. 7, 2016, 16 pp.

"SMPTE ST 2094-40:2016: Dynamic Metadata for Color Volume Transform—Application #4," SMPTE, Jun. 13, 2016, 26 pp.

DVB Organization: "CM-UHDTV0074 CEA-8613-Final_DVB.pdf", DVB, Digital Video Broadcasting, C/O EBU- 17A Ancienne Route—CH-1218 Grand Saconnex, Geneva—Switzerland, Mar. 10, 2015, XP017846002, 18 pp.

Francois E., et al., "High Dynamic Range and Wide Color Gamut Video Coding in HEVC: Status and Potential Future Enhancements," IEEE Transactions on Circuits and Systems for Video Technology, Institute of Electrical and Electronics Engineers, USA, vol. 26, No. 1, Jan. 1, 2016, pp. 63-75, XP011592169, ISSN: 1051-8215, DOI:10.1109/TCSVT.2015.2461911 [retrieved on Jan. 5, 2016].

"Measurement methods—High Dynamic Range Video," IEC TR 62935: 2016, IEC, 3, Rue De Varembe, PO BOX 131, CH-1211 Geneva 20,Switzerland, Jul. 18, 2016, pp. 1-14, XP082004466, [retrieved on Jul. 18, 2016].

Second Written Opinion from International Application No. PCT/US2017/048414, dated Mar. 12, 2018, 8 pp.

International Preliminary Report on Patentability—PCT/US2017/048414, The International Bureau of WIPO—Geneva, Switzerland, dated Jun. 14, 2018, 42 pp.

Response to Written Opinion filed in PCT/US2017/048414 dated Feb. 7, 2018, 17 pp.

\* cited by examiner

Example of EOTFs

COLOR GAMUT ADAPTATION WITH FEEDBACK CHANNEL

This application claims the benefit of U.S. Provisional Application No. 62/379,224, filed Aug. 24, 2016, the entire content of which is incorporated herein by reference.

TECHNICAL FIELD

The disclosure relates to video processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Another aspect of video data is dynamic range. Dynamic range is typically defined as the ratio between the minimum and maximum brightness (e.g., luminance) of a video signal. The dynamic range of common video data used in the past is considered to have a standard dynamic range (SDR). Other example specifications for video data define color data that has a larger ratio between the minimum and maximum brightness. Such video data may be described as having a high dynamic range (HDR).

SUMMARY

In general, this disclosure describes techniques for communicating preferred color gamut settings from a sink device to a source device. The source device may send, through a video interface, first video data to the sink device, which receives the first video data through the video interface. The sink device may then send, through a feedback channel of the video interface, preferred color gamut settings of the sink device to the source device. The preferred color gamut settings may be for content received from the source device. The source device may adapt second video data using the preferred color gamut settings. The source device may then send, through the video interface, the second video data adapted to the preferred color gamut settings to the sink device. In some examples, in adapting the second video data, the source device may determine a set of one or more color gamut mapping parameters to be used by the sink device for converting the second video data to the preferred color gamut. The source device may provide these parameters to the sink device, along with the second video data.

In one example, a method of processing video data includes: receiving, by a sink device and through a video interface, first video data from a source device; sending, by the sink device and to the source device through a feedback channel of the video interface, preferred color gamut settings of the sink device for content received from the source device; and receiving, by the sink device, through the video interface, and based at least in part on the preferred color gamut settings, second video data from the source device.

In another example, an apparatus for encoding video data includes: a memory configured to store the video data; and a sink device implemented using circuitry, software, or a combination thereof, the sink device configured to: receive, through a video interface, first video data from a source device; send, to the source device through a feedback channel of the video interface, preferred color gamut settings of the apparatus for content received from the source device; and receive, through the video interface and based at least in part on the preferred color gamut settings, second video data from the source device.

In another example, a computer-readable storage medium having instructions stored thereon that, when executed, configure an apparatus for processing video data to: receive, through a video interface, first video data from a source device; send, to the source device through a feedback channel of the video interface, preferred color gamut settings of the apparatus for content received from the source device; and receive, through the video interface and based at least in part on the preferred color gamut settings, second video data from the source device.

In another example, an apparatus includes means for receiving, through a video interface, first video data from a source device; means for sending, to the source device through a feedback channel of the video interface, preferred color gamut settings of the sink device for content received from the source device; and means for receiving, through the video interface and based at least in part on the preferred color gamut settings, second video data from the source device.

In another example, a method of processing video data includes: sending, by a source device and through a video interface, first video data to a sink device; receiving, by the source device, from the sink device, and through a feedback channel of the video interface, preferred color gamut settings of the sink device for content received from the source device; adapting, by the source device, second video data using the preferred color gamut settings; and sending, by the source device and through the video interface, the second video data adapted to the preferred color gamut settings to the sink device.

In another example, an apparatus for encoding video data includes: a memory configured to store the video data; and a source device implemented using circuitry, software, or a combination thereof, the source device configured to: send, through a video interface, first video data to a sink device; receive, from the sink device and through a feedback channel of the video interface, preferred color gamut settings of the sink device for content received from the source device; adapt second video data using the preferred color gamut settings; and send, through the video interface, the second video data adapted to the preferred color gamut settings to the sink device.

In another example, a computer-readable storage medium having instructions stored thereon that, when executed, configure an apparatus for processing video data to: send, through a video interface, first video data to a sink device; receive, from the sink device and through a feedback channel of the video interface, preferred color gamut settings of the sink device for content received from the source device; adapt second video data using the preferred color gamut settings; and send, through the video interface, the second video data adapted to the preferred color gamut settings to the sink device.

In another example, an apparatus includes means for sending, through a video interface, first video data to a sink device; means for receiving, from the sink device and through a feedback channel of the video interface, preferred color gamut settings of the sink device for content received from the source device; means for adapting second video data using the preferred color gamut settings; and means for sending, through the video interface, the second video data adapted to the preferred color gamut settings to the sink device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
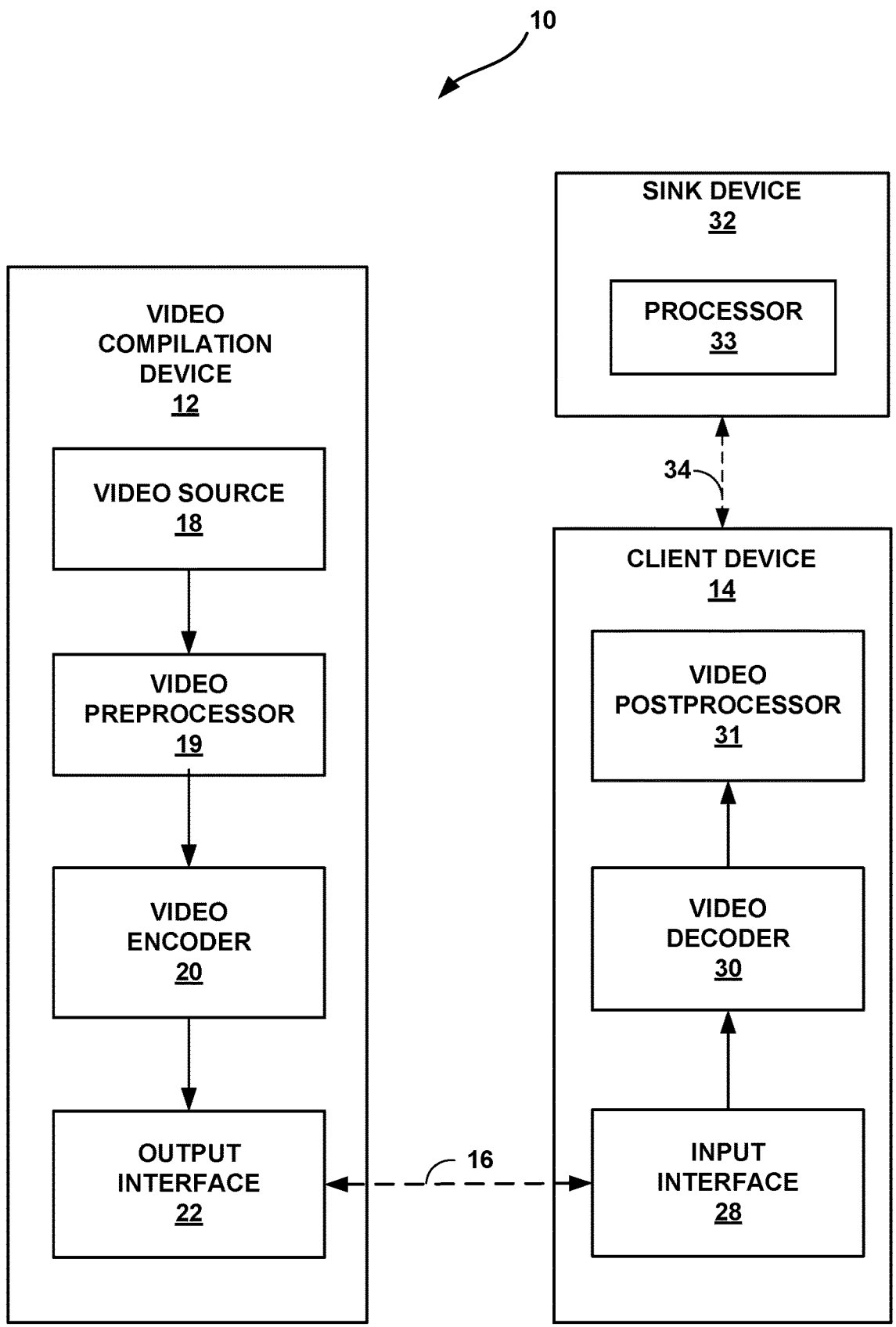
FIG. 1 is a block diagram illustrating an example system that includes a sink device configured to send preferred color gamut settings to a source device through a feedback channel, in accordance with the techniques of the disclosure.

In general, the techniques of this disclosure describe techniques for a sink device to send preferred color gamut settings to a source device via a feedback channel of a video interface such that the source device may adapt content that the source device sends to the sink device using the preferred color gamut settings. A color gamut refers to the range of colors that a device can capture (e.g., a camera), code, or reproduce (e.g., a display). Often, color gamuts differ from device to device. For video coding, a predefined color gamut for video data may be used such that each device in the video coding process may be configured to process pixel values in the same color gamut. Some color gamuts are defined with a larger range of colors than color gamuts that have been traditionally used for video coding. Such color gamuts with a larger range of colors may be referred to as a wide color gamut (WCG).

When a source device begins to send video data to a sink device, the color gamut settings are generally defined by the source device itself without having knowledge of the sink device. This may lead to the sink device displaying the received video data with sub-optimal color output due to the color gamut settings of the received video data being outside of color gamut configuration of the sink device. In other examples, the source device may send multiple color gamut options, forcing the sink device to process each of the color gamut options, select one of the color gamut options, and transform the received video data based on the selected color gamut option prior to displaying the video data. Rather than continue to receive the video data with color information outside of the sink device's color gamut or force the sink device to perform multiple computation-heavy processes to transform the video data, the techniques described herein enable a sink device to signal one or more data blocks to include preferred color gamut settings that are within the color gamut configuration of the sink device. The source device may then adapt the video data being sent to the sink device such that the color gamut of the video data aligns, falls within, or at least is closer to the color gamut of the sink device.

In this way, the sink device may more efficiently decode the received video data, as the color of the video data may be more closely aligned with the color gamut of the sink device. This may result in the sink device displaying a clearer image with colors more true to the original video data from the source device, as well as reduced power consumption. Further, enabling the sink device to advertise its capabilities (i.e. more parameters associated with its capabilities) may enable the source device to process the content into a format that is supported or preferable by the sink device. This may reduce the complexity of design of sink devices for processes including display adaptation and color volume transformation, as some of these processes may be conducted at the source device. The techniques described herein may also enable the source device to perform guided mapping of the content to the high dynamic range (HDR) or WCG capabilities of the sink device to preserve artistic intent.

Further, if the processing is to be conducted at the sink device, advertising the capabilities of the sink device may enable the source device to only send metadata or parameters that are relevant to the sink device rather than sending an excessive amount of metadata and parameters that may not be of use to the sink device. For some of the color volume transformations, it is expected that several hundred parameter sets may be signaled for indicating different parameters for different parts of the image/video, as well as different types of target display characteristics.

The techniques of this disclosure are applicable for digital video interfaces such as those that support signaling of ultra-high definition (UHD) and HDR/WCG video signals to end devices/displays or TVs, e.g., HDMI 2.0, USB-C, Wi-Fi, radio frequency transmissions (e.g., Bluetooth), etc., any of which may be classified as video interface 34 of FIG. 1. The techniques and devices described herein may improve compression efficiency of hybrid-based video coding systems (e.g., H.265/HEVC, H.264/AVC, etc.) utilized for coding HDR and WCG video data.

Video coding standards, including hybrid-based video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The design of a new video coding standard, namely High Efficiency Video coding (HEVC, also called H.265), has been finalized by the Joint Collaboration Team on Video Coding (JCT-VC) of ITU-T Video Coding Experts Group (VCEG) and ISO/IEC Motion Picture Experts Group (MPEG). An HEVC draft specification referred to as HEVC Working Draft 10 (WD10), Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from phenix.int-evry.fr/jct/doc_end_user/documents/12_Geneva/wg11/JCTVC-L1003-v34.zip. The finalized HEVC standard is referred to as HEVC version 1.

A defect report, Wang et al., "High efficiency video coding (HEVC) Defect Report," Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, JCTVC-N1003v1, is available from phenix.int-evry.fr/jct/doc_end_user/documents/14_Vienna/wg11/JCTVC-N1003-v1.zip. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013, and another version of the finalized HEVC standard was published in October 2014.

Following the decoding process, uncompressed video signal is signaled through a high-speed digital physical interface to an end consumer device, such as a display or a TV. Protocols, requirements, and recommendations for the utilization of uncompressed digital interfaces by consumer electronics devices such as Digital Televisions (DTVs), digital cable, satellite or terrestrial set-top boxes (STBs), and related peripheral devices including, but not limited to DVD players/recorders, and other related Sources or Sinks are specified in CTA-861 specification.

FIG. 1 is a block diagram illustrating an example system 10 that includes sink device 32 configured to send preferred color gamut settings to client device 14 (also referred to throughout this disclosure as "source device") through a feedback channel, in accordance with the techniques of the disclosure. As shown in FIG. 1, system 10 includes a video compilation device 12 that provides encoded video data to be decoded at a later time by a client device 14, which sends the decoded video data to sink device 32 for display. In particular, video compilation device 12 provides the video data to client device 14 via a computer-readable medium 16. Video compilation device 12, client device 14, and sink device 32 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, video compilation device 12 and client device 14 may be equipped for wireless communication.

Client device 14 may receive the encoded video data to be decoded via computer-readable medium 16. Computer-readable medium 16 may comprise any type of medium or device capable of moving the encoded video data from video compilation device 12 to client device 14. In one example, computer-readable medium 16 may comprise a communication medium to enable video compilation device 12 to transmit encoded video data directly to client device 14 in real-time. The encoded video data may be modulated according to a communication standard, such as a wired or wireless communication protocol, and transmitted to client device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from video compilation device 12 to client device 14.

In other examples, computer-readable medium 16 may include non-transitory storage media, such as a hard disk, flash drive, compact disc, digital video disc, Blu-ray disc, or other computer-readable media. In some examples, a network server (not shown) may receive encoded video data from video compilation device 12 and provide the encoded video data to client device 14, e.g., via network transmission. Similarly, a computing device of a medium production facility, such as a disc stamping facility, may receive encoded video data from video compilation device 12 and produce a disc containing the encoded video data. Therefore, computer-readable medium 16 may be understood to include one or more computer-readable media of various forms, in various examples.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by video compilation device 12. Client device 14 may access stored video data from the storage device via streaming or download. The file server may be any type of server capable of storing encoded video data and transmitting encoded video data to the client device 14. Example file servers include a web server (e.g., for a website), an FTP server, network attached storage (NAS) devices, or a local disk drive. Client device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, video compilation device 12 includes video source 18, video preprocessor 19, video encoder 20, and output interface 22. Client device 14 includes input interface 28, video decoder 30, and video postprocessor 31. Sink device 32 includes processor 33. Video postprocessor 31 of client device 14 and processor 33 of sink device 32 may be configured to implement the techniques of this disclosure, including signaling and related operations applied to video data in certain color spaces to enable more efficient compression of HDR and WCG video data. In some examples, video preprocessor 19 may be separate from video encoder 20. In other examples, video preprocessor 19 may be part of video encoder 20. In other examples, a source device and a destination device may include other components or arrangements. For example, video compilation device 12 may receive video data from an external video source 18, such as an external camera. Likewise, client device 14 may include sink device 32 as an integrated sink device rather than a separate device.

The illustrated system 10 of FIG. 1 is merely one example. Techniques for processing HDR and WCG video data may be performed by any digital video encoding and/or video decoding device. Moreover, the techniques of this disclosure may also be performed by a video preprocessor and/or video postprocessor. A video preprocessor may be any device configured to process video data before encoding (e.g., before HEVC encoding). A video postprocessor may be any device configured to process video data after decoding (e.g., after HEVC decoding). Video compilation device 12, client device 14, and sink device 32 are merely examples of such coding devices in which video compilation device 12 generates coded video data for transmission to client device 14. In some examples, devices 12, 14, and 32 may operate in a substantially symmetrical manner such that each of devices 12, 14, and 32 include video encoding and decoding components, as well as a video preprocessor and a video postprocessor (e.g., video preprocessor 19 and video postprocessor 31, respectively). Hence, system 10 may support one-way or two-way video transmission between video devices 12, 14, e.g., for video streaming, video playback, video broadcasting, or video telephony.

Video source 18 of video compilation device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, video compilation device 12 and client device 14 may form so-called camera phones or video phones. As mentioned above, however, the techniques described in this disclosure may be applicable to video coding and video processing, in general, and may be applied to wireless and/or wired applications. In each case, the captured, pre-captured, or computer-generated video may be encoded by video encoder 20. The encoded video information may then be output by output interface 22 onto a computer-readable medium 16.

Input interface 28 of client device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Sink device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video preprocessor 19 and video postprocessor 31 each may be implemented as any of a variety of suitable encoder circuitry, such as one or more microprocessors, DSPs, ASICs, FPGAs, discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual. In other examples, video encoder 20 and video decoder 30 may be configured to operate according to the HEVC standard.

As will be explained in more detail below, video postprocessor 31 and processor 33 may be configured to implement the techniques of this disclosure. In some examples, video postprocessor 31 may send, through video interface 34, first video data to processor 33, which receives the first video data through the video interface. Processor 33 may then send, through a feedback channel of the video interface, preferred color gamut settings of client device 14 to video postprocessor 31. The preferred color gamut settings may be for content received from video compilation device 12. Video postprocessor 31 may adapt second video data using the preferred color gamut settings. Video postprocessor 31 may then send, through the video interface, the second video data adapted to the preferred color gamut settings to processor 33. In other words, video postprocessor 31 may be configured to receive the preferred color gamut settings, and processor 33 may be configured to signal the preferred color gamut settings.

Video preprocessor 19, video postprocessor 31, and processor 33 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. As discussed above video preprocessor 19 and video postprocessor 31 may be separate devices from video encoder 20 and video decoder 30, respectively. In other examples, video preprocessor 19 may integrated with video encoder 20 in a single device and video postprocessor 31 may be integrated with video decoder 30 in a single device.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications may operate with video data representing captured scenery with HDR and a WCG. Parameters of the utilized dynamic range and the color gamut are two independent attributes of video content, and their specification for purposes of digital television and multimedia services are defined by several international standards. For example ITU-R Rec. BT.709, "Parameter values for the HDTV standards for production and international programme exchange," defines parameters for HDTV (high definition television), such as standard dynamic range (SDR) and standard color gamut, and ITU-R Rec. BT.2020, "Parameter values for ultra-high definition television systems for production and international programme exchange," specifies ultra-high definition television (UHDTV) parameters such as HDR and WCG. There are also other standards developing organization (SDOs) documents that specify dynamic range and color gamut attributes in other systems, e.g., DCI-P3 color gamut is defined in SMPTE-231-2 (Society of Motion Picture and Television Engineers) and some parameters of HDR are defined in SMPTE-2084. A brief description of dynamic range and color gamut for video data is provided below.

Dynamic range is typically defined as the ratio between the minimum and maximum brightness (e.g., luminance) of the video signal. Dynamic range may also be measured in terms of "f-stop," where one f-stop corresponds to a doubling of a signal's dynamic range. In MPEG's definition, HDR content is content that features brightness variation with more than 16 f-stops. In some terms, levels with between 10 and 16 f-stops are considered as intermediate dynamic range, but it is considered HDR in other definitions. In some examples of this disclosure, HDR video content may be any video content that has a higher dynamic range than traditionally used video content with a standard dynamic range (e.g., video content as specified by ITU-R Rec. BT.709).

Figure 2:
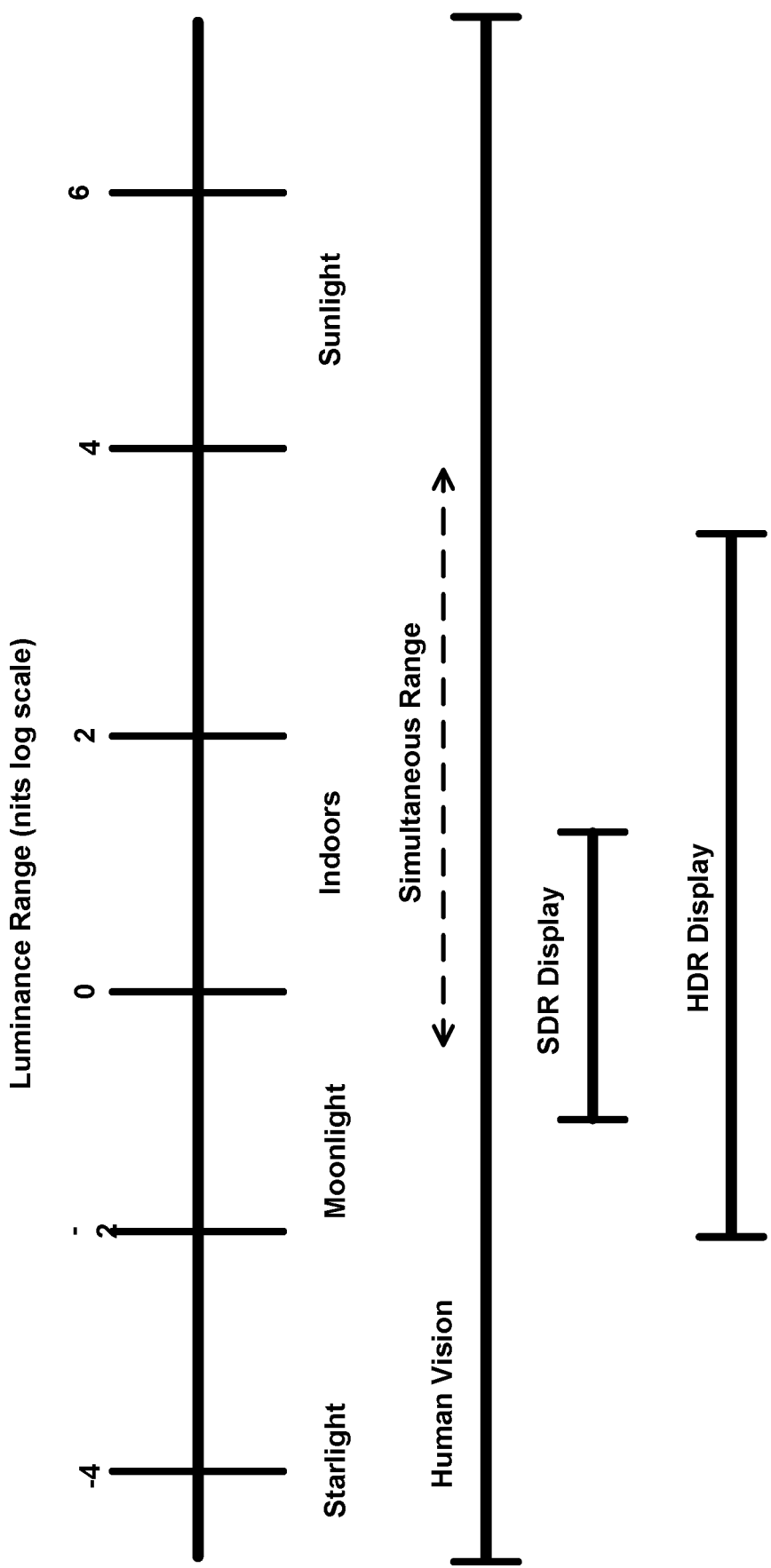
FIG. 2 is a conceptual drawing illustrating the concepts of HDR data.

FIG. 2 is a conceptual drawing illustrating the concepts of HDR data. The human visual system (HVS) is capable for perceiving much larger dynamic ranges than SDR content and HDR content. However, the HVS includes an adaptation mechanism to narrow the dynamic range of the HVS to a so-called simultaneous range. The width of the simultaneous range may be dependent on current lighting conditions (e.g., current brightness). A visualization of the dynamic range provided by SDR of HDTV, the expected HDR of UHDTV, and the HVS dynamic range is shown in FIG. 2.

Current video application and services are regulated by ITU Rec.709 and provide SDR, typically supporting a range of brightness (e.g., luminance) of around 0.1 to 100 candelas (cd) per $m^2$ (often referred to as "nits"), leading to less than 10 f-stops. Some example next generation video services are expected to provide dynamic range of up to 16 f-stops. Some initial parameters have been specified in SMPTE-2084 and ITU-R Rec. 2020.

Figure 3:
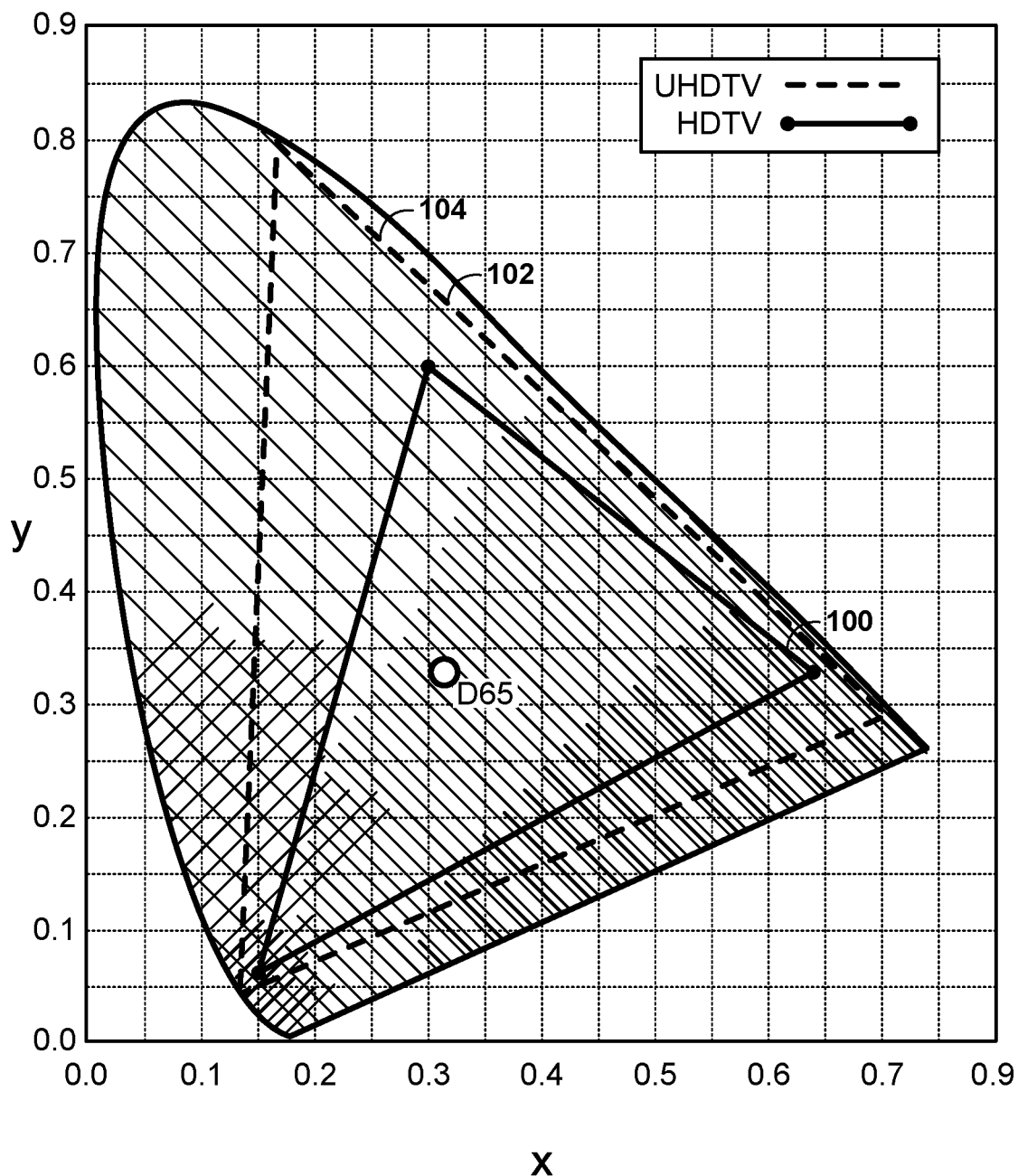
FIG. 3 is a conceptual diagram illustrating example color gamuts.

Another aspect for a more realistic video experience, besides HDR, is the color dimension. The color dimension is typically defined by the color gamut. FIG. 3 is a conceptual diagram illustrating example color gamuts, including an SDR color gamut (triangle 100 based on the BT.709 color primaries), and the wider color gamut that for UHDTV (triangle 102 based on the BT.2020 color primaries). FIG. 3 also depicts the so-called spectrum locus (delimited by the tongue-shaped area 104), representing the limits of the natural colors. As illustrated by FIG. 3, moving from BT.709 (triangle 100) to BT.2020 (triangle 102) color primaries aims to provide UHDTV services with about 70% more colors. D65 specifies an example white color for the BT.709 and/or BT.2020 specifications.

Examples of color gamut specifications for the DCI-P3, BT.709, and BT.202 color spaces are shown in Table 1.

TABLE 1

Color gamut parameters
RGB color space parameters

| Color space | White point | | Primary colors | | | | | |
|---|---|---|---|---|---|---|---|---|
| | $x_w$ | $y_w$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the X and Y values of a white point, and by the X and Y values of the primary colors (e.g., red (R), green (G), and blue (B). The X and Y values represent the chromaticity (X) and the brightness (Y) of the colors, as is defined by the CIE 1931 color space. The CIE 1931 color space defines the links between pure colors (e.g., in terms of wavelengths) and how the human eye perceives such colors.

HDR/WCG video data is typically acquired and stored at a very high precision per component (even floating point), with the 4:4:4 chroma sub-sampling format and a very wide color space (e.g., CIE XYZ). This representation targets high precision and is almost mathematically lossless. However, such a format for storing HDR/WCG video data may include a lot of redundancies and may not be optimal for compression purposes. A lower precision format with HVS-based assumptions is typically utilized for state-of-the-art video applications.

Figure 4:
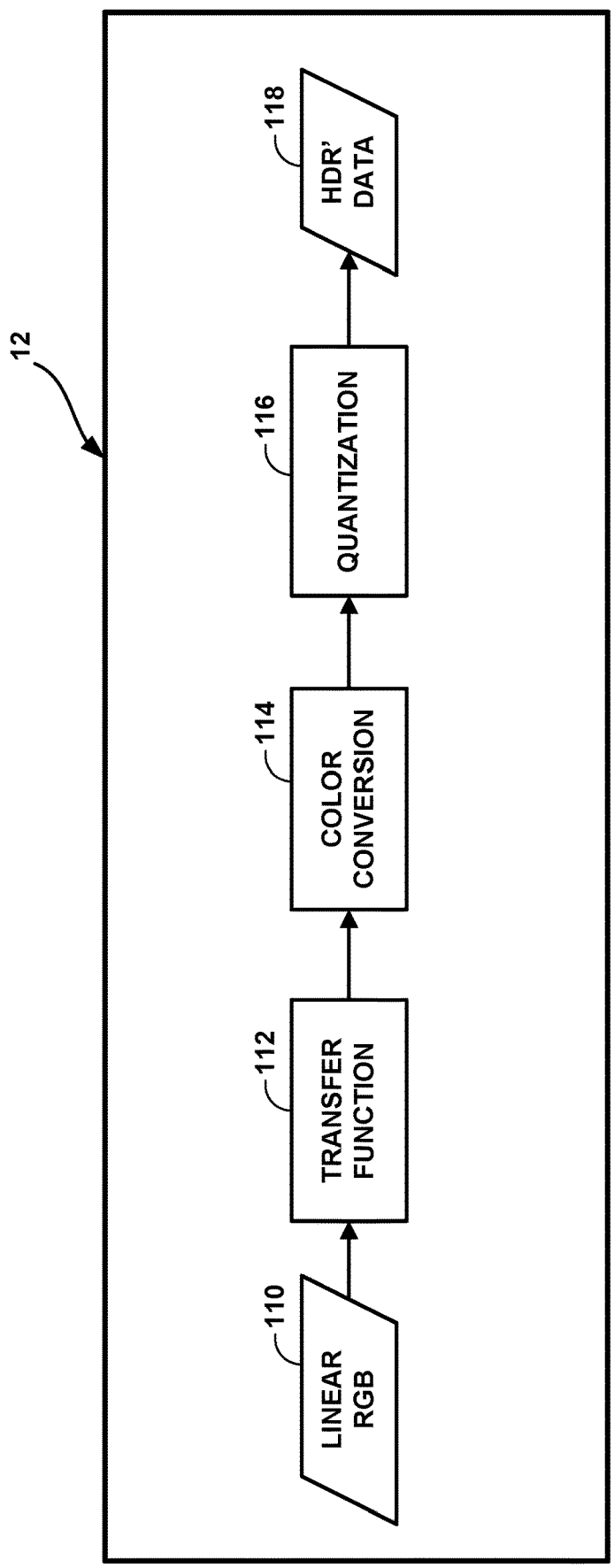
FIG. 4 is a flow diagram illustrating an example of HDR/WCG representation conversion.

FIG. 4 is a flow diagram illustrating an example of HDR/WCG representation conversion. One example of a video data format conversion process for purposes of compression includes three major processes, as shown in FIG. 4. Video compilation device 12 may perform the techniques of FIG. 4. Linear RGB data 110 may be HDR/WCG video data and may be stored in a floating point representation. Video compilation device 12 may compact linear RGB data 110 using a non-linear transfer function (TF) 112 for dynamic range compacting. Video compilation device 12 may utilize transfer function 112 to compact linear RGB data 110 using any number of non-linear transfer functions, e.g., the PQ TF as defined in SMPTE-2084. In some examples, video compilation device 12 performs color conversion process 114 to convert the compacted data into a more compact or robust color space (e.g., a YUV or YCrCb color space) that is more suitable for compression by a hybrid video encoder. Video compilation device 12 then quantizes this data using a floating-to-integer representation quantization unit 116 to produce converted HDR' data 118. In this example HDR' data 118 is in an integer representation. The HDR' data is now in a format more suitable for compression by a hybrid video encoder (e.g., video encoder 20 applying HEVC techniques). The order of the processes depicted in FIG. 4 is given as an example, and may vary in other applications. For example, color conversion may precede the TF process. In addition, additional processing, e.g., spatial subsampling, may be applied to color components.

With regard to the techniques of FIG. 4, in general, a transfer function is applied to data (e.g., HDR/WCG video data) to compact the dynamic range of the data. Such compaction allows the data to be represented with fewer bits. In one example, the transfer function may be a one-dimensional (1D) non-linear function and may reflect the inverse of an electro-optical transfer function (EOTF) of the end-user display, e.g., as specified for SDR in Rec. 709. In another example, the transfer function may approximate the HVS perception to brightness changes, e.g., the PQ transfer function specified in SMPTE-2084 for HDR. The inverse process of the OETF is the EOTF (electro-optical transfer function), which maps the code levels back to luminance.

Figure 5:
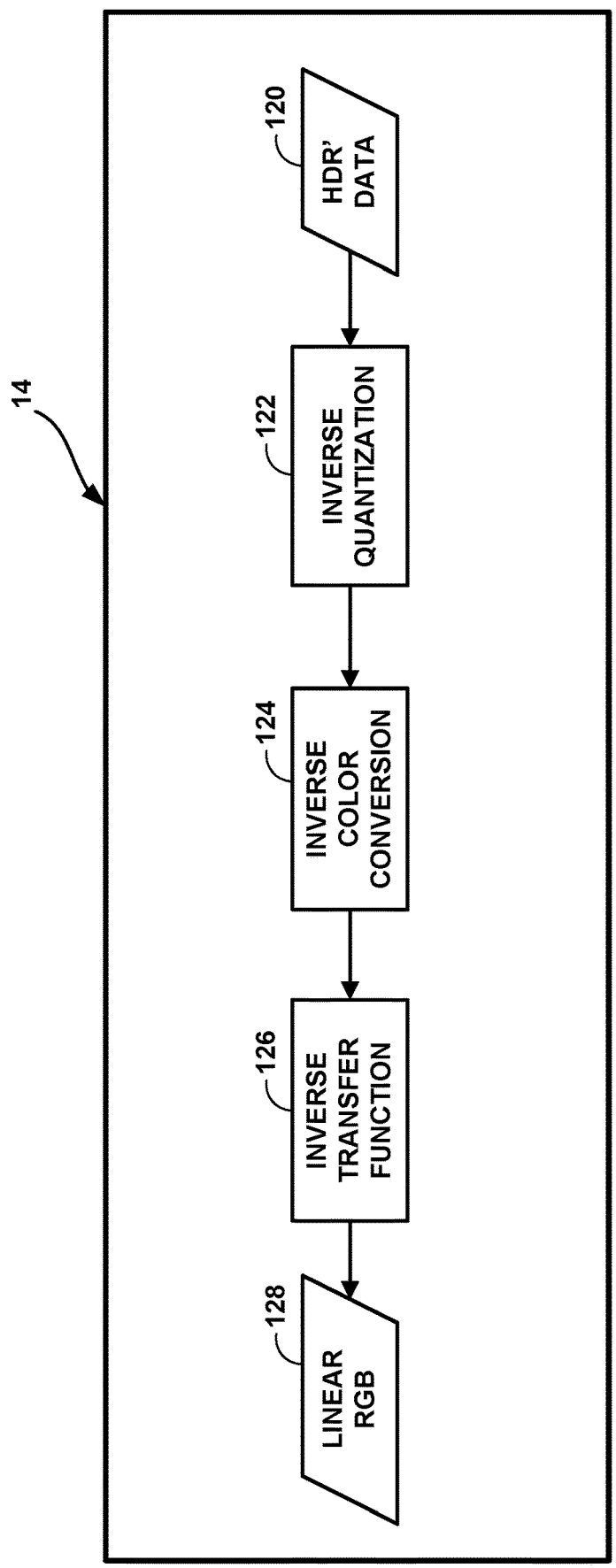
FIG. 5 is a flow diagram illustrating an example of HDR/WCG inverse conversion.

FIG. 5 is a flow diagram illustrating an example of HDR/WCG inverse conversion. The inverse conversion at the decoder side is depicted in FIG. 5. The techniques of FIG. 5 may be performed by client device 14, and in particular, by video postprocessor 31 of FIG. 1. Client device 14 may obtain converted HDR' data 120 at client device 14 through decoding video data using a hybrid video decoder (e.g., video decoder 30 applying HEVC techniques). Client device 14 may then inverse quantize HDR' data 120 using inverse quantization unit 122. Client device 14 may then apply an inverse color conversion process 124 to the inverse quantized HDR' data. The inverse color conversion process 124 may be the inverse of color conversion process 114. For example, client device 14 may use the inverse color conversion process 124 to convert the HDR' data from a YCrCb format back to an RGB format. Next, client device 14 may apply inverse transfer function 126 to the data to add back the dynamic range that was compacted by transfer function 112 to recreate the linear RGB data 128.

Figure 6:
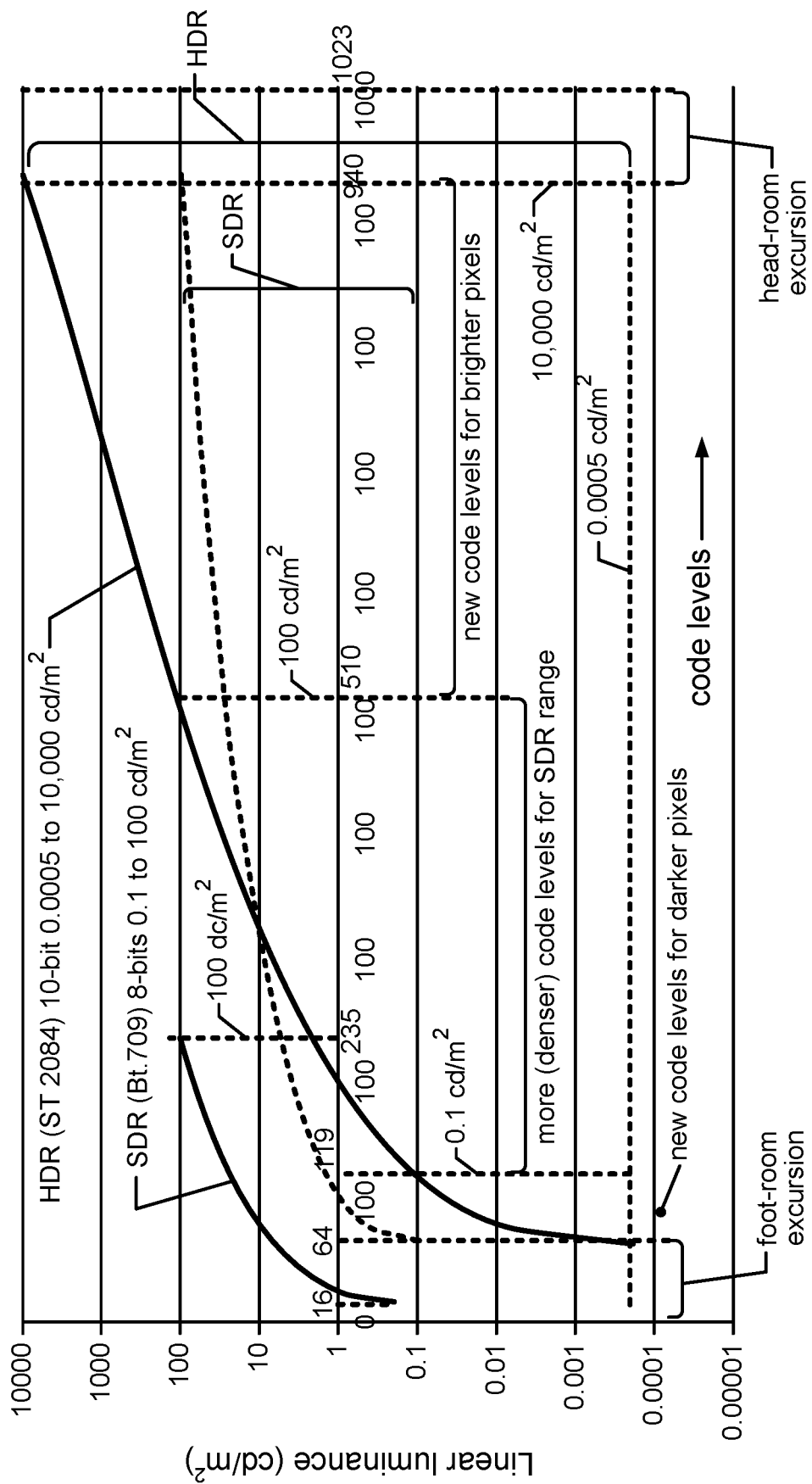
FIG. 6 is conceptual diagram illustrating example of Electro-optical transfer functions (EOTF) utilized for video data conversion (including SDR and HDR) from perceptually uniform code levels to linear luminance.

FIG. 6 is conceptual diagram illustrating examples of Electro-optical transfer functions (EOTF) utilized for video data conversion (including SDR and HDR) from perceptually uniform code levels to linear luminance. FIG. 6 shows several examples of non-linear transfer function used to compact the dynamic range of certain color containers. The transfer functions may also be applied to each R, G and B component separately.

The reference EOTF specified by the ITU-R recommendation BT.1886 may be specified by the equation:

$$L = a(\max[(V+b), 0])^\gamma$$

where:
L: Screen luminance in cd/m2
$L_W$: Screen luminance for white
$L_B$: Screen luminance for black V: Input video signal level (normalized, black at V=0, to white at V=1. For content mastered per Recommendation ITU-R BT.709, 10-bit digital code values "D" map into values of V per the following equation: V=(D−64)/876

γ: Exponent of power function, $\gamma = 2.40_4$ a: Variable for user gain (legacy "contrast" control)

$$a = \left(L_W^{\frac{1}{\gamma}} - L_B^{\frac{1}{\gamma}}\right)^\gamma$$

b: Variable for user black level lift (legacy "brightness" control)

$$b = \frac{L_B^{1/\gamma}}{L_W^{1/\gamma} - L_B^{1/\gamma}}$$

Above variables a and b are derived by solving following equations in order that V=1 gives
L=$L_W$ and that V=0 gives L=$L_B$:

$$L_B = a \cdot b^\gamma$$

$$L_w = a \cdot (1+b)^\gamma$$

In order to support higher dynamic range data more efficiency, SMPTE has recently standardized a new transfer function called SMPTE ST-2084. Specification of ST2084 defined the EOTF application as following. TF is applied to a normalized linear R, G, B values which results in nonlinear representation of R'G'B'. ST2084 defines normalization by NORM=10000, which is associated with a peak brightness of 10000 nits (cd/m2).

$$R' = PQ\_TF(\max(0, \min(R/NORM, 1)))$$

$$G' = PQ\_TF(\max(0, \min(G/NORM, 1)))$$

$$B' = PQ\_TF(\max(0, \min(B/NORM, 1)))$$

with $$PQ\_TF(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Typically, EOTF is defined as a function with a floating point accuracy, thus no error is introduced to a signal with this non-linearity if inverse TF so called OETF is applied. Inverse TF (OETF) specified in ST2084 is defined as inversePQ function:

$$R = 100000 * \text{inversePQ\_TF}(R')$$

$$G = 100000 * \text{inversePQ\_TF}(G')$$

$$B = 100000 * \text{inversePQ\_TF}(B')$$

with $$\text{inversePQ\_TF}(N) = \left(\frac{\max[(N^{1/m_2} - c_1), 0]}{c_2 - c_3 N^{1/m_2}}\right)^{1/m_1}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Note that EOTF and OETF are subjects of active research and standardization, and TFs utilized in some video coding systems may be different from ST2084.

In the context of this disclosure, the terms "signal value" or "color value" may be used to describe a luminance level corresponding to the value of a specific color component (such as R, G, B, or Y) for an image element. The signal value is typically representative of a linear light level (luminance value). The terms "code level" or "digital code value" may refer to a digital representation of an image signal value. Typically, such a digital representation is representative of a nonlinear signal value. An EOTF represents the relationship between the nonlinear signal values provided to a display device (e.g., sink device 32) and the linear color values produced by the display device.

RGB data is typically utilized as the input color space, since RGB is the type of data that is typically produced by image capturing sensors. However, the RGB color space has high redundancy among its components and is not optimal for compact representation. To achieve more compact and a more robust representation, RGB components are typically converted (e.g., a color transform is performed) to a more uncorrelated color space that is more suitable for compression, e.g., YCbCr. A YCbCr color space separates the brightness in the form of luminance (Y) and color information (CrCb) in different less correlated components. In this context, a robust representation may refer to a color space featuring higher levels of error resilience when compressed at a constrained bitrate.

Following the color transform, input data in a target color space may be still represented at high bit-depth (e.g. floating point accuracy). The high bit-depth data may be converted to a target bit-depth, for example, using a quantization process. Certain studies show that 10-12 bits accuracy in combination with the PQ transfer is sufficient to provide HDR data of 16 f-stops with distortion below the Just-Noticeable Difference (JND). In general, a JND is the amount something (e.g., video data) must be change in order for a difference to be noticeable (e.g., by the HVS). Data represented with 10 bits accuracy can be further coded with most of the state-of-the-art video coding solutions. This quantization is an element of lossy coding and is a source of inaccuracy introduced to converted data.

Next generation HDR/WCG video applications may operate with video data captured at different parameters of HDR and CG. Examples of different configuration can be the capture of HDR video content with peak brightness up-to 1000 nits, or up-to 10,000 nits. Examples of different color gamut may include BT.709, BT.2020 as well SMPTE specified-P3, or others.

A single color space, e.g., a target color container, that incorporates all other currently used color gamut may be utilized. One example of such a target color container is BT.2020. Support of a single target color container may simplify standardization, implementation and deployment of HDR/WCG systems, since a reduced number of operational points (e.g., number of color containers, color spaces, color conversion algorithms, etc.) and/or a reduced number of required algorithms should be supported by a decoder (e.g., video decoder 30).

In one example of such a system, content captured with a native color gamut (e.g. P3 or BT.709) different from the target color container (e.g. BT.2020) may be converted to the target container prior to processing (e.g., prior to video encoding). Below are several examples of such conversion:

RGB conversion from BT.709 to BT.2020 color container:

$$R_{2020} = 0.627404078626 * R_{709} + 0.329282097415 * G_{709} + 0.043313797587 * B_{709}$$

$$G_{2020} = 0.069097233123 * R_{709} + 0.919541035593 * G_{709} + 0.011361189924 * B_{709}$$

$$B_{2020} = 0.016391587664 * R_{709} + 0.088013255546 * G_{709} + 0.895595009604 * B_{709}$$

RGB conversion from P3 to BT.2020 color container:

$$R_{2020} = 0.753832826496 * R_{P3} + 0.198597635641 * G_{P3} + 0.047569409186 * B_{P3}$$

$$G_{2020} = 0.045744636411 * R_{P3} + 0.941777687331 * G_{P3} + 0.012478735611 * B_{P3}$$

$$B_{2020} = -0.001210377285 * R_{P3} + 0.017601107390 * G_{P3} + 0.983608137835 * B_{P3}$$

For modern video coding systems, typically used color space is YCbCr, as specified in ITU-R BT.709. The YCbCr color space in BT.709 standard specifies the following conversion process from R'G'B' to Y'CbCr (non-constant luminance representation):

$$Y' = 0.2126 * R' + 0.7152 * G' + 0.0722 * B'$$

$$Cb = (B'' - Y')/1.8556$$

$$Cr = (R'' - Y')/1.5748$$

The above can also be implemented using the following approximate conversion that avoids the division for the Cb and Cr components:

$$Y' = 0.212600 * R' + 0.715200 * G' + 0.072200 * B'$$

$$Cb = -0.114572 * R' - 0.385428 * G' + 0.500000 * B'$$

$$Cr = 0.500000 * R' - 0.454153 * G' - 0.045847 * B'$$

During this conversion, the dynamic range of a signal captured in P3 or BT.709 color gamut may be reduced in a BT.2020 representation. Since the data is represented in floating point accuracy, there is no loss; however, when combined with color conversion (e.g., a conversion from RGB to YCrCB shown in equation 3 below) and quantization (example in equation 4 below), dynamic range reduction leads to increased quantization error for input data.

$$Y' = 0.2627*R' + 0.6780*G' + 0.0593*B';$$

$$Cb = \frac{B' - Y'}{1.8814};$$

$$Cr = \frac{R' - Y'}{1.4746}$$

$$D_{Y'} = (\text{Round}((1 \ll (\text{BitDepth}_Y - 8))*(219*Y' + 16)))$$

$$D_{Cb} = (\text{Round}((1 \ll (\text{BitDepth}_{Cr} - 8))*(224*Cb + 128)))$$

$$D_{Cr} = (\text{Round}((1 \ll (\text{BitDepth}_{Cb} - 8))*(224*Cr + 128)))$$

with

Round($x$) = Sign($x$)*Floor(Abs($x$) + 0.5)

Sign($x$) = −1 if $x < 0$, 0 if $x = 0$, 1 if $x > 0$

Floor($x$)the largest integer less than or equal to $x$

Abs($x$) = $x$ if $x >= 0$, −$x$ if $x < 0$

Clip1$_Y$($x$) = Clip3(0, (1 ≪ BitDepth$_Y$) − 1, $x$)

Clip1$_C$($x$) = Clip3(0, (1 ≪ BitDepth$_C$) − 1, $x$)

Clip3($x$, $y$, $z$) = $x$ if $z < x$, $y$ if $z > y$, $z$ otherwise

In the above equations, equation $D_{Y'}$ is the quantized Y' component, $D_{Cb}$ is the quantized Cb and $D_{Cr}$ is the quantized Cr component. The term ≪ represents a bit-wise right shift. BitDepth$_Y$, BitDepth$_{Cr}$, and BitDepth$_{Cb}$ are the desired bit depths of the quantized components, respectively.

The above can also be implemented using the following approximate conversion that avoids the division for the Cb and Cr components:

$$Y'=0.262700*R'+0.678000*G'+0.059300*B'$$

$$Cb=-0.139630*R'-0.360370*G'+0.500000*B'$$

$$Cr=0.500000*R'-0.459786*G'-0.040214*B'$$

In addition, in a real-world coding system, coding a signal with reduced dynamic range may lead to significant loss of accuracy for coded chroma components and would be observed by a viewer as coding artifacts, e.g., color mismatch and/or color bleeding.

An uncompressed video signal is signaled through a high-speed digital physical interface from a decoder (e.g., a source device, such as client device 14) to an end consumer device (e.g., sink device 32), such as a display or TV. Protocols, requirements, and recommendations for the utilization of uncompressed digital interfaces by consumer electronics devices such as Digital Televisions (DTVs), digital cable, satellite or terrestrial set-top boxes (STBs), and related peripheral devices including, but not limited to DVD players/recorders, and other related Sources or Sinks are defined in specification produced by Consumer Electronics Association (CTA) R4.8 DTV Interface Subcommittee, CTA-861. Protocols, requirements, and recommendations that are defined include Video Formats and waveforms; colorimetry and quantization; transport of compressed and uncompressed, as well as Linear Pulse Code Modulation (L-PCM), audio; carriage of auxiliary data; and implementations of the Video Electronics Standards Association (VESA) Enhanced Extended Display Identification Data Standard (E-EDID), which is used by Sinks to declare display capabilities and characteristics.

The CTA 861-G specification may include the Extended InfoFrame data structure for the purpose of carrying larger amounts of dynamic (temporally varying) metadata, which can be used for smart processing, guided mapping, display adaptation and color volume transformation applicable at the end device, such as display or TV with information provided from the video signal source, such as decoder or receiver. Type of the Extended InfoFrame application is identified with 2-byte number. When the Extended InfoFrame Type Code is set to 0×0001, 0×0002, 0×0003, or 0×0004, the Extended InfoFrame would carry HDR Dynamic Metadata. The HDR Dynamic Metadata Extended InfoFrame contains the HDR Dynamic Metadata that may be carried in Supplementary Enhancement Information (SEI) messages of the compressed video bitstream, such as HEVC, AVC or VP8/VP9/VP10 bitstreams, or others.

If the source device (e.g., client device 14) supports transmission of a type of HDR Dynamic Metadata Extended InfoFrame (as indicated by the relevant Extended InfoFrame Type) and if the source device determines that the sink device (e.g., sink device 32) is capable of receiving that information, the source device may send the HDR Dynamic Metadata Extended InfoFrame in conjunction with the video encoded according to the rules of the HDR metadata type. A source device shall not send an HDR Dynamic Metadata Extended InfoFrame containing an Extended InfoFrame Type 0×0001, 0×0002, 0×0003, or 0×004 to a sink device that does not indicate support for that Extended InfoFrame Type in the sink device's HDR Dynamic Metadata Data Block.

The communication between the sink device and the source device is conducted via Extended Display Identification Data (EDID). This data, which is stored in the sink device, describes Video Formats that the DTV (display) is capable of receiving and rendering. The information is supplied to the source device, over the interface, upon the request of the source device. The source device then chooses its output format, taking into account the format of the original video stream and the formats supported by the sink device.

Parameters of display capabilities are communicated between Sink and Source in several specified data blocks, e.g. Colorimetry Data Block, HDR Static Metadata Block, HDR Dynamic Metadata Data Block and others.

The Colorimetry Data Block indicates support of specific extended colorimetry standards and gamut-related as yet, such as BT.2020 or DCI-P3. The HDR Data Block indicates the HDR capabilities of the Sink through such parameters as characteristics of display's EOTF (BT.1886, ST 2084 or others), desired parameters of dynamical range of the content, e.g. desired content Min/Max Luminance or desired content max frame-average luminance for optimal rendering of content on the display. The HDR Dynamic Metadata Data Block indicates a type and version of the supported HDR Dynamic Metadata Type.

Display capabilities described in Colorimetry Data Block (CDB) and HDR Static Metadata Data Block indicate certain parameters of HDR/WCG capabilities of the sink device. Accepted colorimetry, a.k.a. representation format or color container, e.g. BT.2020 or DCI-P3 are specified in the CDB. Whereas display HDR capabilities in a form of desired Min/Max content luminance are defined in HDR Static Metadata Data Block.

The information that is relayed through the above blocks allow the source device to convert the decoded uncompressed signal into a format that is understandable by the sink device. The conversion process may include either HDR tone mapping (to meet desired max luminance level) and/or color container conversion (to meet supported colorimetry format) of the content, or selection of HDR Dynamic Metadata Type and parameters entity, which would allow the sink device to conduct signal adaptation to meet its capabilities.

However, the problem of signal adaptation in this scenario is not limited to tone mapping (to meet desired max luminance levels) and color container conversion. Display adaptation would also include color gamut mapping to adapt signal to color gamut capabilities of the display. In some scenarios, parameters of such mapping can be provided by the HDR Dynamic Metadata information, if color gamut capabilities of the display would be available to the source device. This may greatly reduce the computational complexity of the color volume mapping at the sink device and would allow the source device to conduct guided mapping to a target display to preserve an artistic intent in a new environment.

In addition, the current techniques do not specify any means for the sink device to indicate the sample value ranges that it supports. Fixed length coded video/image representations of data containing one or more channels (e.g., three channels in RGB and YCbCr representations) may not use the full range to represent the data. For example, the popular "limited range" only allows values of 16 to 235, inclusive, for luma samples and 16 to 240, inclusive for chroma (Cb and Cr) values for 8-bit YCbCr representation. Full range representation uses the entire value range to be used for representing the data, e.g., values 0 to 255, inclusive for Y, Cb and Cr channels in 8-bit YCbCr representations. Other such range representations, not enumerated here, also exist; currently there are no means for the Sink to express support for those representations as well.

The techniques of this disclosure describe several display adaptation methods for digital video interfaces with feedback channel. Although many of the methods are described with respect to digital video interfaces signaling of UHD and HDR/WCG video signals to end devices, such as display or TV, it is to be understood that one or more of the techniques described here may also be included in other interfaces where some for communication exists between a sender (that sends the data) and a receiver (that receives the data) to determine the capabilities of the receiver and the source modifies the data or selects parameters to be signalled based on the determination.

In general, a sink device may signal, through a feedback channel of the video interface to a source device, such as EDID of the CTA 861, information on color gamut capabilities or parameters of desired color gamut of the content to be provided to the sink device (end device). Parameters of the desired color gamut can be described in various ways. In one example, the sink device may signal colorimetry representation that is close to the desired color gamut and/or color container, e.g. BT.709 or DCI-P3, explicitly or using an ID to Table 69 of the CTA 861 spec.

Non-limiting examples include introducing this information to HDR Static Metadata Data Block, example of update to the Table 82 of CTA 861-G specification text is shown in the row labelled Byte # N/8:

TABLE 2

HDR Static Metadata Data Block

| Byte# | Bits | | | | | | | |
|---|---|---|---|---|---|---|---|---|
| | 7 | 6 | 5 | 4 | 3 | 2 | 1 | 0 |
| 1 | Tag Code (0x07) | | | | Length of following data block = n bytes | | | |
| 2 | Extended Tag Code (0x06) | | | | | | | |
| 3 | F37 = 0 | F36 = 0 | ET_5 | ET_4 | ET_3 | ET_2 | ET_1 | ET_0 |
| 4 | SM_7 | SM_6 | SM_5 | SM_4 | SM_3 | SM_2 | SM_1 | SM_0 |
| 5 | Desired Content Max Luminance data (8 bits) | | | | | | | |
| 6 | Desired Content Max Frame-average Luminance data (8 bits) | | | | | | | |
| 7 | Desired Content Min Luminance data (8 bits) | | | | | | | |
| N/8 | Desired color gamut data (N bits) | | | | | | | | where the desired color gamut data is represented with identification of the colorimetry representation most close to the desired color gamut, e.g. an ID to Table 69 of the CTA 861-G spec text, which is reproduced below in Table 3.

TABLE 3

Data Byte 3 Colorimetry Support Flags

| Flag | Colorimetry |
|---|---|
| xvYCC$_{601}$ | Standard Definition Colorimetry based on IEC 61966-2-4 |
| xvYCC$_{709}$ | High Definition Colorimetry based on IEC 61966-2-4 |
| sYCC$_{601}$ | Colorimetry based on IEC 61966-2-1/Amendment 1 |
| Adobe$_{YCC601}$ | Colorimetry based on IEC 61966-2-5, Annex A |
| Adobe$_{RGB}$ | Colorimetry based on IEC 61966-2-5 |
| BT2020$_{cYCC}$ | Colorimetry based on ITU-R BT.2020 Y'cC'$_{BC}$C'$_{RC}$ |
| BT2020$_{YCC}$ | Colorimetry based on ITU-R BT.2020 Y'C'$_B$C'$_R$ |
| BT2020$_{RGB}$ | Colorimetry based on ITU-R BT.2020 R'G'B' |
| DCI-P3 | Colorimetry based on DCI-P3 |

In another example, the sink device may signal the desired color gamut data in the form of a multi-segment 3D volume description of the supported and/or desired color gamut.

In another instance, the sink device may define parameters of desired color gamut data may through color gamut primaries represented in a normalized representation, e.g. 0 . . . 1, as it shown in Table 1. In another instance, the sink device may provide a more elaborate description of the color volume supported by the display. This may include description of the color volume using RGB primaries, or using a footprint of the color volume in another color space, such as xyY or Lab. In yet another instance, the sink device may signal parameters of desired color gamut data in another data block of the feedback channel, e.g. in HDR Dynamic Metadata Data Block.

The sink device may adapt the video signal to provided color gamut capabilities/or desired color gamut through video data color volume transformation for a color volume of the content available at the source to the color volume specified by HDR parameters, e.g. such as desired Min/Max luminance of the content and parameters of desired color gamut. The sink device may further adapt the video signal to provide color gamut capabilities or desired color gamut parameters by using parameters provided via HDR Dynamic Metadata Block. Based on the parameters of the sink device's capabilities, such as the desired minimum or maximum luminance of the content and the parameters of the desired color gamut, the source device may select a subset of parameters from a set of available parameters which may be provided with the content. The source device may signal the selected parameters may be signalled to the sink device.

In some examples, the parameters available at the source device with the content may include a plurality color volume transform parameter sets. As such, the source device may select one or more color volume parameter sets to be sent to the sink device.

The source device may include a sample range representation in data blocks such that the sink device may express support for one or more sample ranges (e.g. limited range, full range, etc.). The source device may use this information to process the content from the sample range representation to a representation that the sink device supports. An example of such signaling is provided below, although the signaling may be implemented by other means (e.g. in other data blocks)

TABLE 4

Sample value range data block

| Byte# | bits | | | | | | | |
|---|---|---|---|---|---|---|---|---|
| | 7 | 6 | 5 | 4 | 3 | 2 | 1 | 0 |
| 1 | VR_7 | VR_6 | VR_5 | VR_4 | VR_3 | VR_2 | VR_1 | VR_0 |

TABLE 5

Supported sample value range descriptor

| SM_n | Supported Static Metadata Descriptor |
|---|---|
| VR_0 | Limited range |
| VR_1 | Full range |
| VR_2 | Restricted range |
| VR_3 | SDI range |
| VR_4 to VR_7 | Reserved for future use (0) |

Rather than continue to receive the video data with color information outside of the sink device's color gamut or force the sink device to perform multiple computation-heavy processes to transform the video data, the techniques described herein enable a sink device to signal one or more data blocks to include preferred color gamut settings that are within the color gamut configuration of the sink device. The source device may then adapt the video data being sent to the sink device such that the color gamut of the video data aligns, falls within, or at least is closer to the color gamut of the sink device.

In this way, the sink device may more efficiently decode the received video data, as the color of the video data may be more closely aligned with the color gamut of the sink device. This may result in the sink device displaying a clearer image with colors more true to the original video data from the source device, as well as reduced power consumption. Further, enabling the sink device to advertise its capabilities (i.e. more parameters associated with its capabilities) may enable the source device to process the content into a format that is supported or preferable by the sink device. This may reduce the complexity of design of sink devices for processes including display adaptation and color volume transformation, as some of these processes may be conducted at the source device. The techniques described herein may also enable the source device to perform guided mapping of the content to the high dynamic range (HDR) or WCG capabilities of the sink device to preserve artistic intent.

Further, if the processing is to be conducted at the sink device, advertising the capabilities of the sink device may enable the source device to only send metadata or parameters that are relevant to the sink device rather than sending an excessive amount of metadata and parameters that may not be of use to the sink device. For some of the color volume transformations, it is expected that several hundred parameter sets may be signaled for indicating different parameters for different parts of the image/video, as well as different types of target display characteristics.

Figure 7:
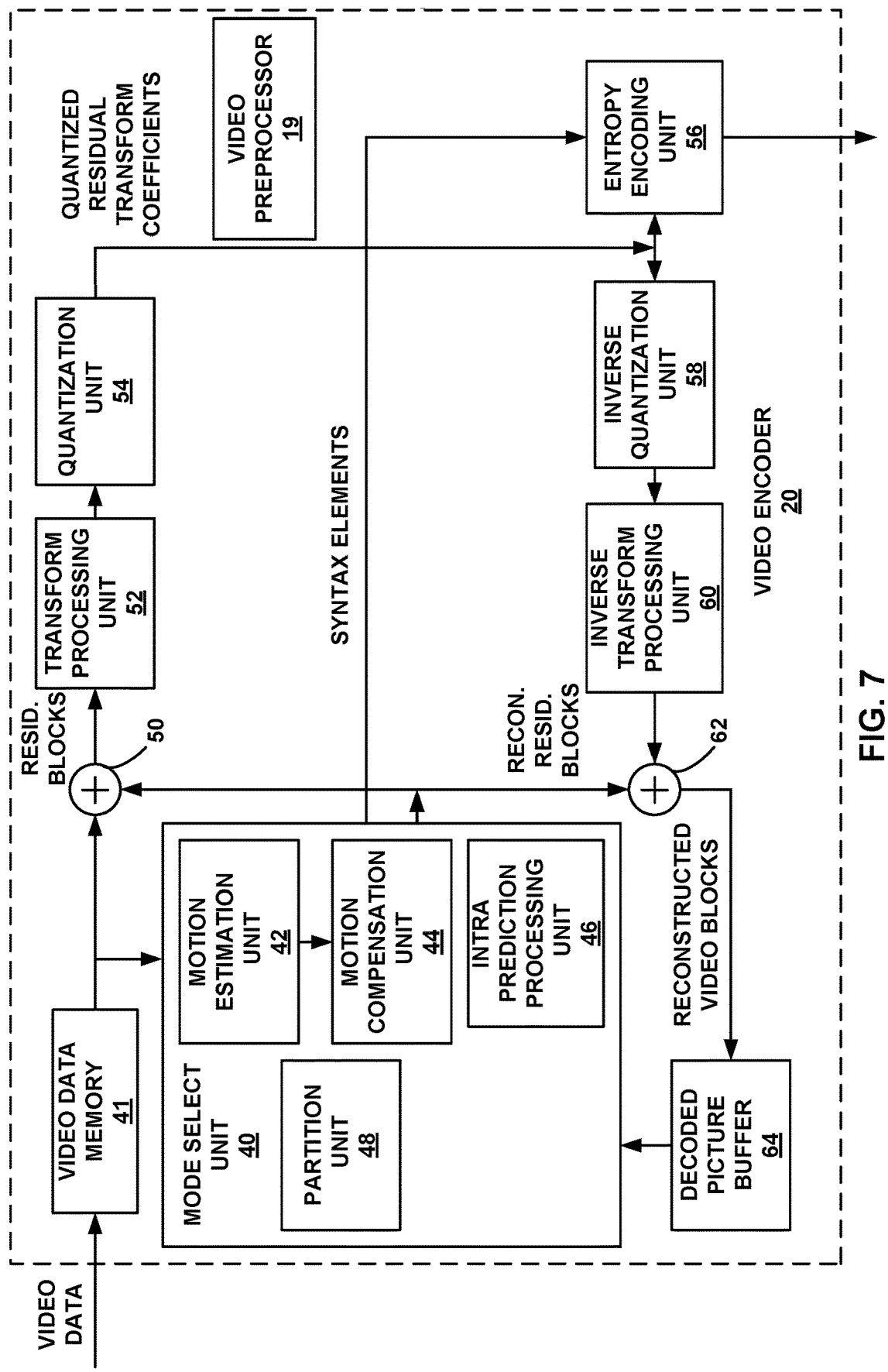
FIG. 7 is a block diagram illustrating an example of a video encoder in a video compilation device.

FIG. 7 is a block diagram illustrating an example of video encoder 20 that may implement the techniques of this disclosure. Video encoder 20 may perform intra- and inter-coding of video blocks within video slices in a target color container that have been processed by video preprocessor 19. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

In the example of FIG. 7, video preprocessor 19 may be integrated with video encoder 20 in a single device. Video preprocessor 19 may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. As discussed above, in other examples, video preprocessor 19 may be separate devices from video encoder 20, respectively.

As shown in FIG. 7, video encoder 20 receives a current video block within a video frame to be encoded. In the example of FIG. 7, video encoder 20 includes mode select unit 40, a video data memory 41, decoded picture buffer 64, summer 50, transform processing unit 52, quantization unit 54, and entropy encoding unit 56. Mode select unit 40, in turn, includes motion compensation unit 44, motion estimation unit 42, intra prediction processing unit 46, and partition unit 48. For video block reconstruction, video encoder 20 also includes inverse quantization unit 58, inverse transform processing unit 60, and summer 62. A deblocking filter (not shown in FIG. 7) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes.

For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

After selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

Figure 8:
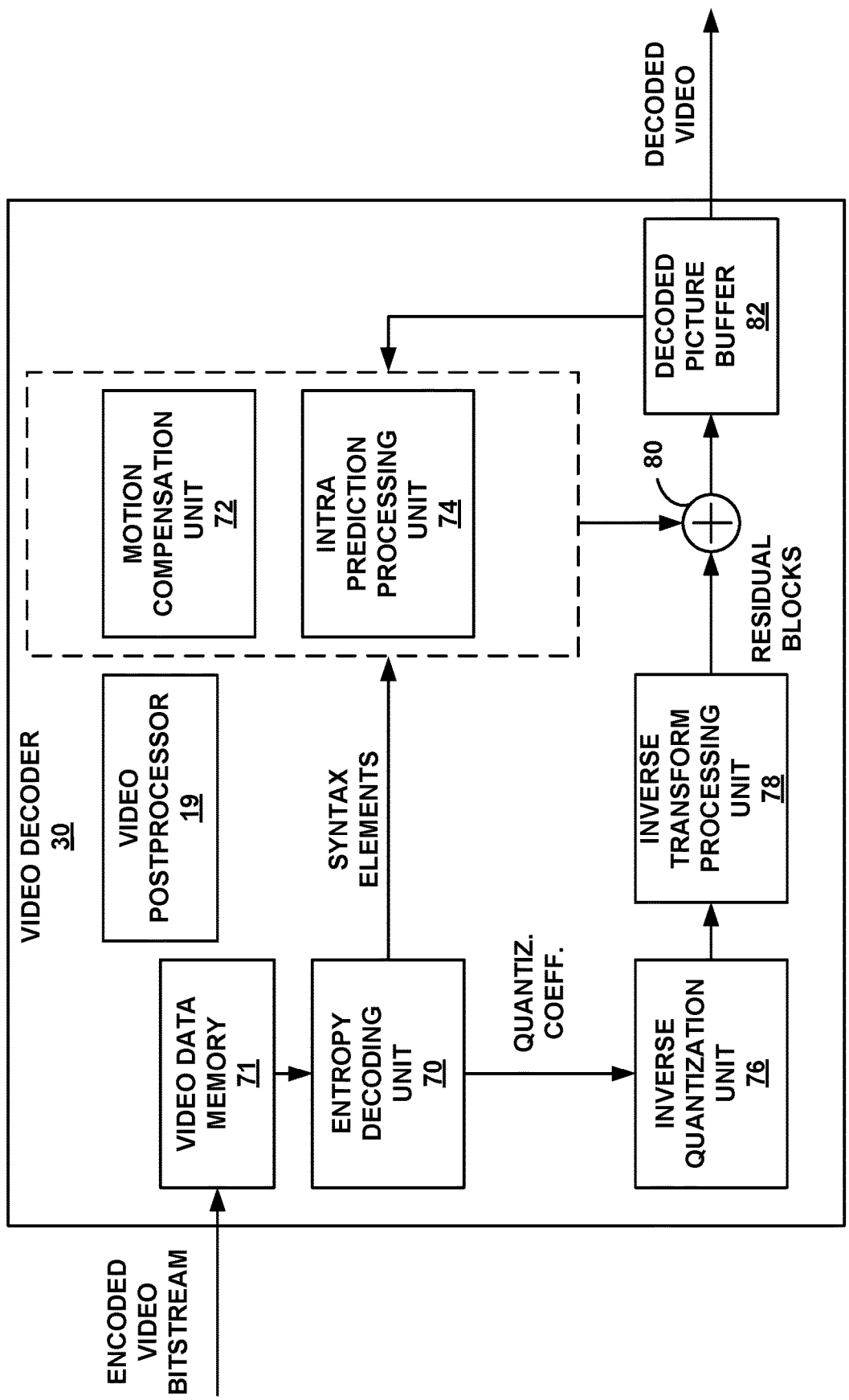
FIG. 8 is a block diagram illustrating an example of a video decoder in a source device that may implement techniques of this disclosure.

FIG. 8 is a block diagram illustrating an example of video decoder 30 that may implement the techniques of this disclosure. In particular, video decoder 30 may decode video data into a target color container that may then be processed by video postprocessor 31, as described above. In the example of FIG. 8, video decoder 30 includes an entropy decoding unit 70, a video data memory 71, motion compensation unit 72, intra prediction processing unit 74, inverse quantization unit 76, inverse transform processing unit 78, decoded picture buffer 82 and summer 80. Video decoder 30 may, in some examples, perform a decoding pass generally reciprocal to the encoding pass described with respect to video encoder 20 (FIG. 7). Motion compensation unit 72 may generate prediction data based on motion vectors received from entropy decoding unit 70, while intra prediction processing unit 74 may generate prediction data based on intra-prediction mode indicators received from entropy decoding unit 70.

In the example of FIG. 8, video postprocessor 31 may be integrated with video decoder 30 in a single device. Video postprocessor 31 may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. As discussed above, in other examples, video postprocessor 31 may be separate devices from video decoder 30, respectively.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as sink device 32 of FIG. 1.

In accordance with one or more techniques of this disclosure, components of video decoder 30, including video postprocessor 31, may be configured to perform any of the techniques described herein. For instance, video postprocessor 31 may send, through a video interface, first video data to a sink device. Video postprocessor 31 may further receive, from the sink device and through a feedback channel of the video interface, preferred color gamut settings of the sink device for content received from video decoder 30. Video postprocessor 31 may adapt second video data using the preferred color gamut settings and send, through the video interface, the second video data adapted to the preferred color gamut settings to the sink device.

In some examples, the preferred color gamut settings may include one or more high dynamic range (HDR) parameters. In such examples, in adapting the second video data, video preprocessor 19 may adapt the second video data using video data color volume transformation for a color volume of the second video data specified by the one or more HDR parameters. The one or more HDR parameters may include one or more of a minimum desired luminance of the content, a maximum desired luminance of the content, and one or more desired color gamut parameters, which may include one or more of a colorimetry representation of a desired color gamut and a color gamut primary represented in a normalized representation.

In some examples, video postprocessor 31 may further process the second video data from a sample range representation such that the sample range representation is supported by the sink device.

In some examples, the preferred color gamut settings may further include one or more of a description of a color volume using RGB primaries and a footprint of a color volume in a color space. The color space may include an xyY color space or a Lab color space.

In some examples, in receiving the preferred color gamut settings, video postprocessor 31 may receive one or more desired color gamut parameters in a first data block and one or more color gamut capabilities in a second data block. The one or more desired color gamut parameters may include color gamut settings that enable optimal performance by the sink device, whereas the one or more color gamut capabilities may include color gamut settings that the sink device is capable of processing. In some examples, the first data block may be an HDR dynamic metadata data block.

Figure 9:
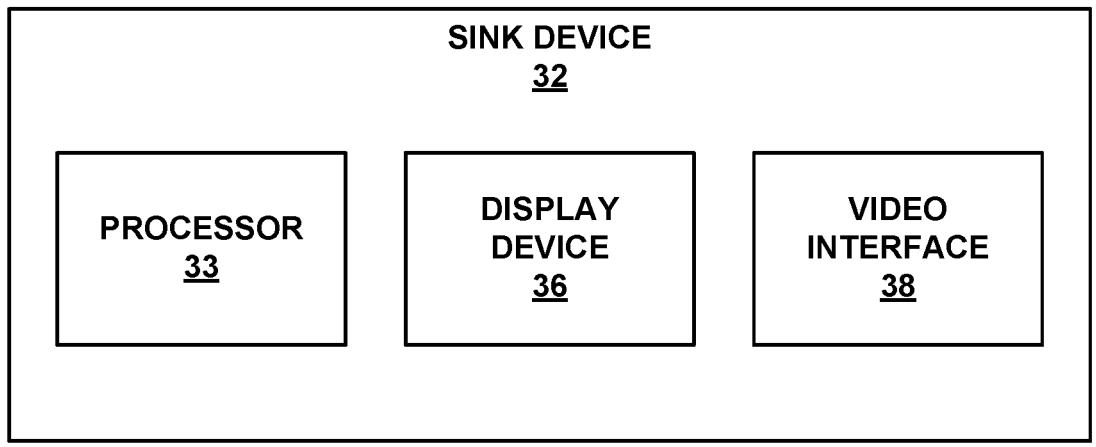
FIG. 9 is a block diagram illustrating an example of a sink device that may implement techniques of this disclosure.

FIG. 9 is a block diagram illustrating an example of sink device 32 that may implement techniques of this disclosure. In the example of FIG. 9, sink device 32 may include processor 33, display device 36, and video interface 38. In other examples, sink device 32 may include more components, such as a power source or a video memory, or fewer components.

Processor 33 may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. As discussed above, in other examples, processor 33 may be separate devices from sink device 32.

Display device 36 may include any structure capable of displaying video data to a user. Examples of display device 36 include liquid crystal displays (LCD), dot matrix displays, light emitting diode (LED) displays, organic light-emitting diode (OLED) displays, e-ink, or similar monochrome or color displays capable of outputting visible information to a user of sink device 32.

Video interface 38 of sink device 32 may communicate with external devices (e.g., client device 14) via one or more wired and/or wireless networks by transmitting and/or receiving network signals on one or more networks. Examples of video interface 38 include a network interface card (e.g. such as an Ethernet card), an optical transceiver, a radio frequency transceiver, a GPS receiver, or any other type of device that can send and/or receive information. Other examples of video interface 38 may include short wave radios, cellular data radios, wireless network radios, as well as universal serial bus (USB) controllers.

In accordance with one or more techniques of this disclosure, components of sink device 32, including processor 33, may be configured to perform any of the techniques described herein. For instance, processor 33 may receive, through a video interface, first video data from a source device. Processor 33 may then send, through a feedback channel of the video interface, preferred color gamut settings of sink device 32 for content received from the source device. Processor 33 may then receive, through the video interface and based at least in part on the preferred color gamut settings, second video data from the source device. The second video data may have color gamut settings that are based on the preferred color gamut settings.

In some examples, the preferred color gamut settings may include one or more of one or more color gamut capabilities and one or more desired color gamut parameters. The one or more desired color gamut parameters may include color gamut settings that enable optimal performance by the sink device, whereas the one or more color gamut capabilities may include color gamut settings that the sink device is capable of processing. In some examples, the one or more desired color gamut parameters may include one or more of a colorimetry representation of a desired color gamut and a color gamut primary represented in a normalized representation. In some such examples, in sending the preferred color gamut settings, processor 33 may signal the one or more desired color gamut parameters in a first data block and signal the one or more color gamut capabilities in a second data block. The first data block may be an HDR dynamic metadata data block.

In some examples, the preferred color gamut settings may further include one or more of a description of a color volume using RGB primaries and a footprint of a color volume in a color space. The color space may include an xyY color space or a Lab color space. In some other instances, the preferred color gamut settings may also include a sample range representation associated with the second video data.

In some examples, processor 33 may also receive one or more HDR parameters from the source device. In such examples, video postprocessor 31 may adapt the content received by the source device using the preferred color gamut settings and the one or more HDR parameters. The one or more HDR parameters may include one or more of a minimum desired luminance of the content, a maximum desired luminance of the content, and one or more desired color gamut parameters.

Figure 10:
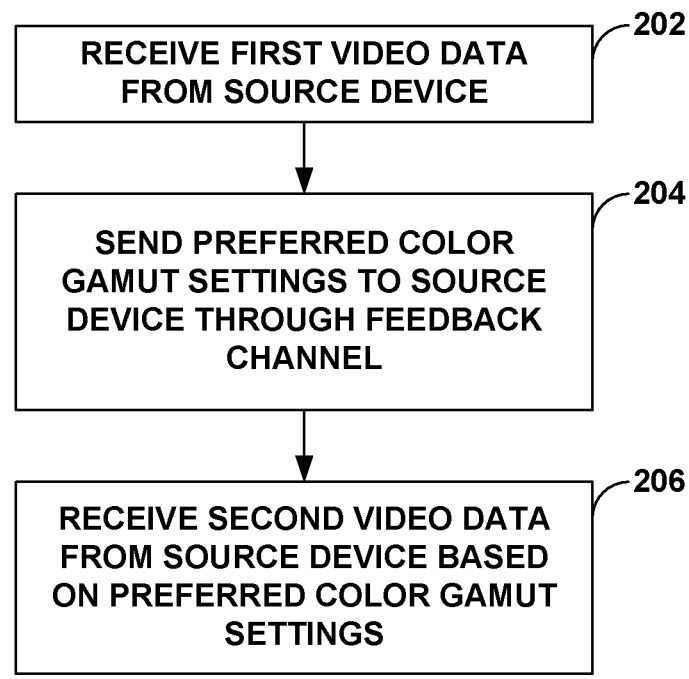
FIG. 10 is a flow diagram illustrating example techniques of a sink device configured to send preferred color gamut settings to a source device through a feedback channel, in accordance with the techniques of this disclosure.

FIG. 10 is a flow diagram illustrating example techniques of a sink device configured to send preferred color gamut settings to a source device through a feedback channel, in accordance with the techniques of this disclosure. The method of FIG. 10 may be performed by sink device 32 and, specifically, processor 33 of sink device 32.

In accordance with one or more techniques of this disclosure, components of sink device 32, including processor 33, may be configured to perform any of the techniques described herein. For instance, processor 33 may receive, through a video interface, first video data from a source device (202). Processor 33 may then send, through a feedback channel of the video interface, preferred color gamut settings of sink device 32 for content received from the source device (204). Processor 33 may then receive, through the video interface and based at least in part on the preferred color gamut settings, second video data from the source device (206). The second video data may have color gamut settings that are based on the preferred color gamut settings.

In some examples, the preferred color gamut settings may include one or more of one or more color gamut capabilities and one or more desired color gamut parameters. The one or more desired color gamut parameters may include color gamut settings that enable optimal performance by the sink device, whereas the one or more color gamut capabilities may include color gamut settings that the sink device is capable of processing. In some examples, the one or more desired color gamut parameters may include one or more of a colorimetry representation of a desired color gamut and a color gamut primary represented in a normalized representation. In some such examples, in sending the preferred color gamut settings, processor 33 may signal the one or more desired color gamut parameters in a first data block and signal the one or more color gamut capabilities in a second data block. The first data block may be an HDR dynamic metadata data block.

In some examples, the preferred color gamut settings may further include one or more of a description of a color volume using RGB primaries and a footprint of a color volume in a color space. The color space may include an xyY color space or a Lab color space. In some other instances, the preferred color gamut settings may also include a sample range representation associated with the second video data.

In some examples, processor 33 may also receive one or more HDR parameters from the source device. In such examples, processor 33 may adapt the content received by the source device using the preferred color gamut settings and the one or more HDR parameters. The one or more HDR parameters may include one or more of a minimum desired luminance of the content, a maximum desired luminance of the content, and one or more desired color gamut parameters.

Figure 11:
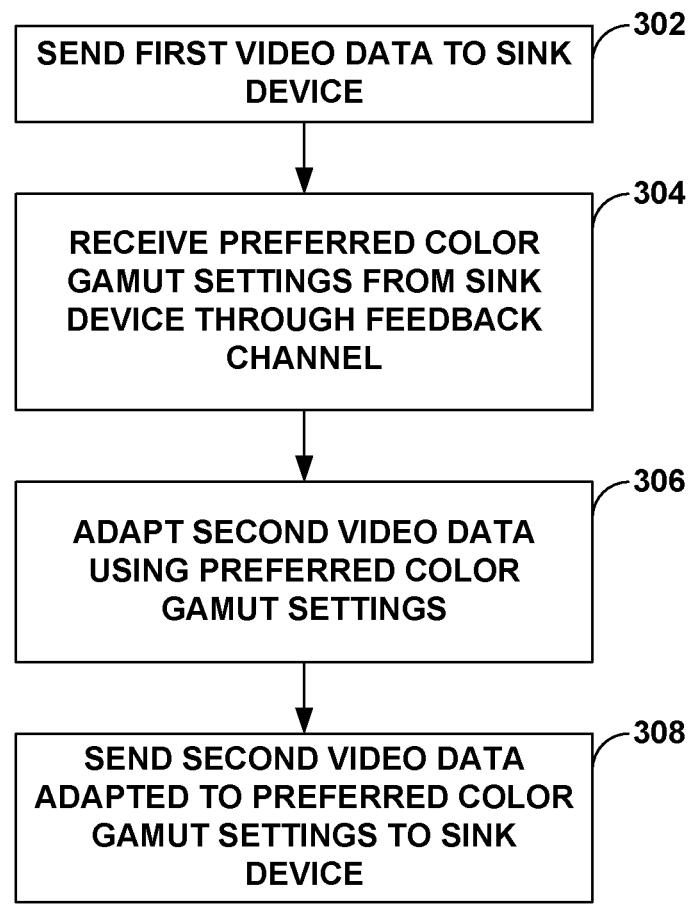
FIG. 11 is a flow diagram illustrating example techniques of a source device configured to receive preferred color gamut settings from a sink device through a feedback channel, in accordance with the techniques of this disclosure.

FIG. 11 is a flow diagram illustrating example techniques of a source device configured to receive preferred color gamut settings from a source device through a feedback channel (e.g., of a display interface, such as an HDMI 2.0 interface), in accordance with the techniques of this disclosure. The method of FIG. 10 may be performed by client device 14 and, specifically, video postprocessor 31 of client device 14.

In accordance with one or more techniques of this disclosure, components of client device 14, including video postprocessor 31, may be configured to perform any of the techniques described herein. For instance, video postprocessor 31 may send, through a video interface (such as an HDMI 2.0 interface), first video data to a sink device (302). Video postprocessor 31 may further receive, from the sink device and through a feedback channel of the video interface, preferred color gamut settings of the sink device for content received from client device 14 (304). Video postprocessor 31 may adapt second video data using the preferred color gamut settings (306) and send, through the video interface, the second video data adapted to the preferred color gamut settings to the sink device (308).

In some examples, in adapting the second video data, client device 14 may determine a set of one or more color gamut mapping parameters (e.g., HDR parameters) to be used by sink device 32 for converting the second video data to the preferred color gamut. Client device 14 may append these parameters to the second video data and provide the combined information to sink device 32. In other examples, in adapting the second video data, client device 14 may map, using the preferred color gamut settings, color information of the second video data to be compatible with the preferred color gamut settings of sink device 32.

In some examples, the preferred color gamut settings may include one or more high dynamic range (HDR) parameters. In such examples, in adapting the second video data, video postprocessor 31 may adapt the second video data using video data color volume transformation for a color volume of the second video data specified by the one or more HDR parameters. The one or more HDR parameters may include one or more of a minimum desired luminance of the content, a maximum desired luminance of the content, and one or more desired color gamut parameters, which may include one or more of a colorimetry representation of a desired color gamut and a color gamut primary represented in a normalized representation.

In some examples, video postprocessor 31 may further process the second video data from a sample range representation such that the sample range representation is supported by the sink device.

In some examples, the preferred color gamut settings may further include one or more of a description of a color volume using RGB primaries and a footprint of a color volume in a color space. The color space may include an xyY color space or a Lab color space.

In some examples, in receiving the preferred color gamut settings, video postprocessor 31 may receive one or more desired color gamut parameters in a first data block and one or more color gamut capabilities in a second data block. The one or more desired color gamut parameters may include color gamut settings that enable optimal performance by the sink device, whereas the one or more color gamut capabilities may include color gamut settings that the sink device is capable of processing. In some examples, the first data block may be an HDR dynamic metadata data block.

Figure 12:
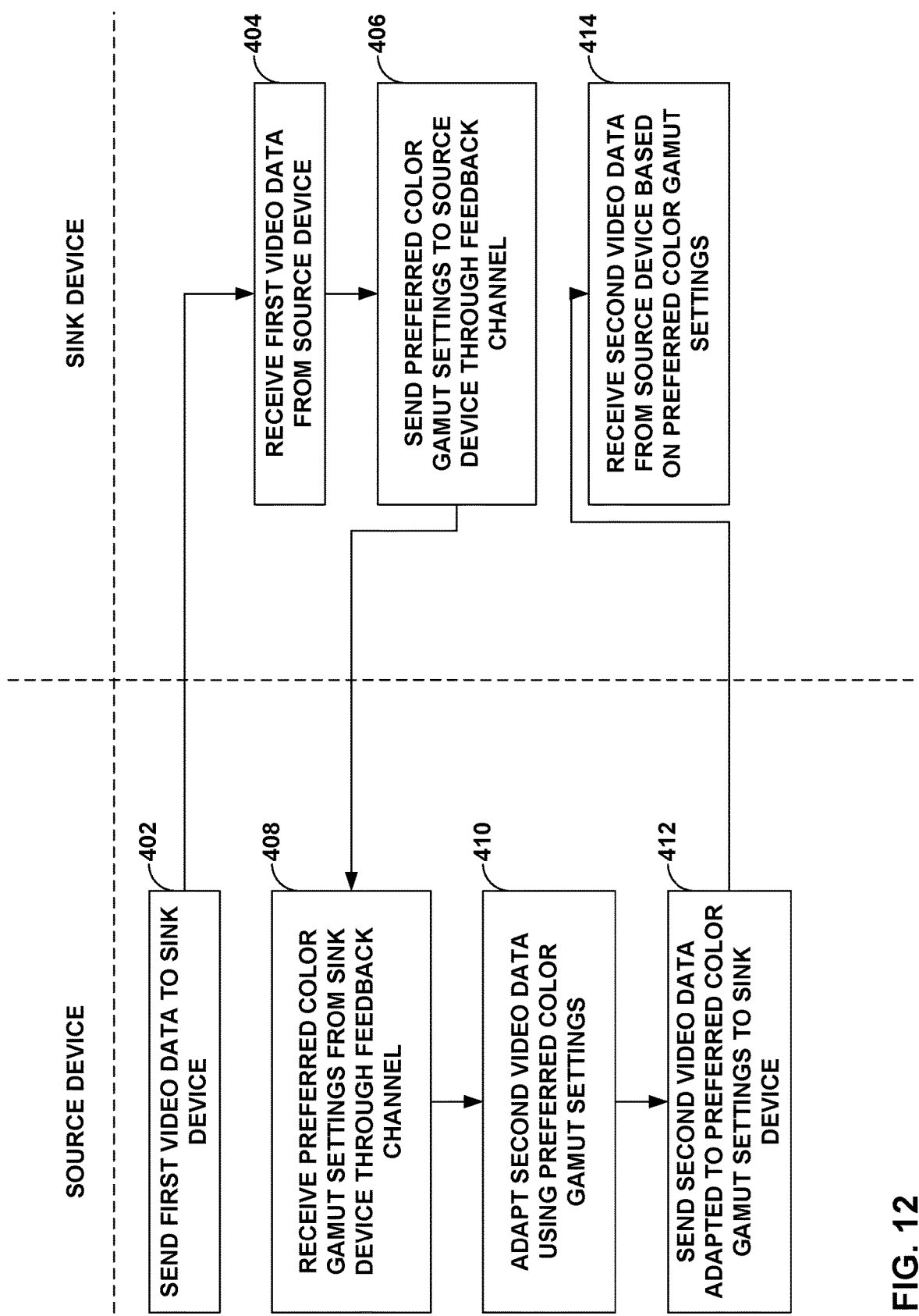
FIG. 12 is a flow diagram illustrating example techniques of a sink device configured to send preferred color gamut settings to a source device through a feedback channel, as well as the source device configured to receive the preferred color gamut settings from the sink device through the feedback channel, in accordance with the techniques of this disclosure.

FIG. 12 is a flow diagram illustrating example techniques of a sink device configured to send preferred color gamut settings to a source device through a feedback channel, as well as the source device configured to receive the preferred color gamut settings from the sink device through the feedback channel, in accordance with the techniques of this disclosure. The method of FIG. 11 may be performed by client device 14 and, specifically, video postprocessor 31 of client device 14, as well as sink device 32 and, specifically, processor 33 of sink device 32.

Client device 14 may send, through a video interface, first video data to sink device 32 (402). Sink device 32 may receive the first video data through the video interface (404). Sink device 32 may then send, through a feedback channel of the video interface, preferred color gamut settings of sink device 32 to client device 14 (406). The preferred color gamut settings may be for content received from client device 14. Client device 14 may receive the preferred color gamut settings from sink device 32 through the feedback channel of the video interface (408). Client device 14 may adapt second video data using the preferred color gamut settings (410). Client device 14 may then send, through the video interface, the second video data adapted to the preferred color gamut settings to sink device 32 (412). Sink device 32 may receive the second video data from client device 14 based on the preferred color gamut settings.

In some examples, in adapting the second video data, client device 14 may determine a set of one or more color gamut mapping parameters to be used by sink device 32 for converting the second video data to the preferred color gamut. Client device 14 may append these parameters to the second video data and provide the combined information to sink device 32. In other examples, in adapting the second video data, client device 14 may map, using the preferred color gamut settings, color information of the second video data to be compatible with the preferred color gamut settings of sink device 32.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method of processing video data, the method comprising:
   receiving, by a sink device that supports high dynamic range (HDR) and wide color gamut (WCG) and through a video interface, first video data from a source device, the first color gamut settings including a first one or more color settings outside of color gamut capabilities of the sink device;
   responsive to receiving the first video data that includes the first one or more color settings outside of the color gamut capabilities of the sink device, sending, by the sink device and to the source device through a feedback channel of the video interface, preferred color gamut settings of the sink device for content received from the source device, wherein the preferred color gamut settings include a multi-segment 3D volume description of a preferred color gamut of the sink device that supports HDR and WCG; and
   receiving, by the sink device, through the video interface, and based at least in part on the preferred color gamut settings, second video data having second color gamut settings from the source device, the second color gamut settings including a second one or more color settings within the color gamut capabilities of the sink device and not including the first one or more color settings outside of the color gamut capabilities of the sink device.

2. The method of claim 1, wherein the preferred color gamut settings further comprise one or more of one or more color gamut capabilities and one or more desired color gamut parameters.

3. The method of claim 2, wherein the one or more desired color gamut parameters include a colorimetry representation of a desired color gamut.

4. The method of claim 2, wherein the one or more desired color gamut parameters include a color gamut primary represented in a normalized representation.

5. The method of claim 2, wherein sending the preferred color gamut settings comprises:
   signaling, by the sink device, the one or more desired color gamut parameters in a first data block; and
   signaling, by the sink device, the one or more color gamut capabilities in a second data block.

6. The method of claim 5, wherein the first data block comprises a high dynamic range (HDR) Dynamic Metadata Data Block.

7. The method of claim 1, wherein the preferred color gamut settings further include one or more of a description of a color volume using RGB.

8. The method of claim 7, wherein the preferred color gamut settings further include a color space, wherein the color space comprises an xyY color space or a Lab color space.

9. The method of claim 1, further comprising:
   receiving, by the sink device, mapping information for the preferred color gamut settings, the mapping information comprising one or more high dynamic range (HDR) parameters from the source device; and
   adapting, by the sink device, the second video data received by the source device using the preferred color gamut settings and the one or more HDR parameters.

10. The method of claim 9, wherein the mapping information further comprises parameters of a mapping function, and wherein the one or more HDR parameters comprise one or more of a minimum desired luminance of the content, a maximum desired luminance of the content, and one or more desired color gamut parameters.

11. The method of claim 1, wherein the preferred color gamut settings further comprise a sample range representation supported by the sink device.

12. A method of processing video data, the method comprising:
   sending, by a source device and through a video interface, first video data to a sink device that supports high dynamic range (HDR) and wide color gamut (WCG), the first data having first color gamut settings including a first one or more color settings outside of color gamut capabilities of the sink device;
   responsive to sending the first video data that includes the first one or more color settings outside of the color gamut capabilities of the sink device , receiving, by the source device, from the sink device, and through a feedback channel of the video interface, preferred color gamut settings of the sink device for content received from the source device, wherein the preferred color gamut settings include a multi-segment 3D volume description of a preferred color gamut of the sink device that supports HDR and WCG;
   adapting, by the source device, second video data using the preferred color gamut settings; and
   sending, by the source device and through the video interface, the second video data adapted to the preferred color gamut settings to the sink device, the second video data having second color gamut settings including a second one or more color settings within the color gamut capabilities of the sink device and not including the first one or more color settings outside of the color gamut capabilities of the sink device.

13. The method of claim 12, wherein adapting the second video data comprises:
determining, by the source device and based on the preferred color gamut settings, mapping information for the preferred color gamut settings, the mapping information comprising one or more high dynamic range (HDR) parameters;
appending, by the source device, the mapping information to the second video data; and
sending, by the source device, the second video data to the sink device with the mapping information.

14. The method of claim 13, wherein the mapping information further comprises parameters of a mapping function, and wherein the one or more HDR parameters comprise one or more of a minimum desired luminance of the content, a maximum desired luminance of the content, and one or more desired color gamut parameters.

15. The method of claim 14, wherein the one or more desired color gamut parameters include one or more of a colorimetry representation of a desired color gamut and a color gamut primary represented in a normalized representation.

16. The method of claim 12, wherein adapting the second video data comprises:
processing, by the source device and using the preferred color gamut settings, the second video data from a sample range representation such that the sample range representation is supported by the sink device.

17. The method of claim 12, wherein the preferred color gamut settings further include one or more of a description of a color volume using RGB primaries and a footprint of a color volume in a color space.

18. The method of claim 17, wherein the color space comprises an xyY color space or a Lab color space.

19. The method of claim 12, wherein receiving the preferred color gamut settings comprises:
receiving, by the source device, one or more desired color gamut parameters in a first data block; and
receiving, by the source device, one or more color gamut capabilities in a second data block.

20. The method of claim 12, wherein adapting the second video data comprises:
mapping, by the source device and using the preferred color gamut settings, color information of the second video data to be compatible with the preferred color gamut settings of the sink device.

21. An apparatus for processing video data, the apparatus comprising:
a memory configured to store the video data; and
a processor implemented using circuitry, the apparatus configured to:
receive, through a video interface, first video data having first color gamut settings from a source device, the first color gamut settings including a first one or more color settings outside of color gamut capabilities of the sink device;
responsive to receiving the first video data that includes the first one or more color settings outside of the color gamut capabilities of the sink device, send, to the source device through a feedback channel of the video interface, preferred color gamut settings of the apparatus for content received from the source device, wherein the preferred color gamut settings include a multi-segment 3D volume description of a preferred color gamut of the apparatus that supports high dynamic range (HDR) and wide color gamut (WCG); and
receive, through the video interface and based at least in part on the preferred color gamut settings, second video data having second color gamut settings from the source device, the second color gamut settings including a second one or more color settings within the color gamut capabilities of the sink device and not including the first one or more color settings outside of the color gamut capabilities of the sink device.

22. The apparatus of claim 21, wherein the preferred color gamut settings further comprise one or more of one or more color gamut capabilities, one or more desired color gamut parameters, and a sample range representation associated with the second video data, wherein the one or more desired color gamut parameters include one or more of a colorimetry representation of a desired color gamut and a color gamut primary represented in a normalized representation.

23. The apparatus of claim 22, wherein the processor being configured to send the preferred color gamut settings comprises the processor being configured to:
signal the one or more desired color gamut parameters in a first data block, wherein the first data block comprises a high dynamic range (HDR) Dynamic Metadata Data Block; and
signal the one or more color gamut capabilities in a second data block.

24. The apparatus of claim 21, wherein the preferred color gamut settings include one or more of a description of a color volume using RGB primaries and a footprint of a color volume in a color space, wherein the color space comprises an xyY color space or a Lab color space.

25. The apparatus of claim 21, wherein the processor is further configured to:
receive mapping information for the preferred color gamut settings, the mapping information comprising parameters of a mapping function and one or more high dynamic range (HDR) parameters from the source device, wherein the one or more HDR parameters comprise one or more of a minimum desired luminance of the content, a maximum desired luminance of the content, and one or more desired color gamut parameters; and
adapt the content received by the source device using the information that includes the preferred color gamut settings and the one or more HDR parameters.

26. A non-transitory computer-readable storage medium having instructions stored thereon that, when executed, configure an apparatus for processing video data to:
receive, through a video interface, first video data having first color gamut settings from a source device, the first color gamut settings including a first one or more color settings outside of color gamut capabilities of the apparatus;
responsive to receiving the first video data that includes the first one or more color settings outside of the color gamut capabilities of the apparatus, send, to the source device through a feedback channel of the video interface, preferred color gamut settings of the apparatus for content received from the source device, wherein the preferred color gamut settings include a multi-segment 3D volume description of a preferred color gamut of the apparatus that supports high dynamic range (HDR) and wide color gamut (WCG); and receive, through the video interface and based at least in part on the preferred color gamut settings, second video data having second color gamut settings from the source device, the second color gamut settings including a second one or more color settings within the color gamut capabilities of the apparatus and not including the first one or more color settings outside of the color gamut capabilities of the apparatus.

27. The non-transitory computer-readable storage medium of claim 26, wherein the preferred color gamut settings comprise one or more of one or more color gamut capabilities, one or more desired color gamut parameters, and a sample range representation associated with the second video data, wherein the one or more desired color gamut parameters include one or more of a colorimetry representation of a desired color gamut and a color gamut primary represented in a normalized representation.

28. The non-transitory computer-readable storage medium of claim 27, wherein the instructions that configure the apparatus to send the preferred color gamut settings comprise instructions that, when executed, configure the apparatus to:
  signal the one or more desired color gamut parameters in a first data block, wherein the first data block comprises a high dynamic range (HDR) Dynamic Metadata Data Block; and
  signal the one or more color gamut capabilities in a second data block.

29. The non-transitory computer-readable storage medium of claim 26, wherein the preferred color gamut settings further include one or more of a description of a color volume using RGB primaries and a footprint of a color volume in a color space, wherein the color space comprises an xyY color space or a Lab color space.

30. The non-transitory computer-readable storage medium of claim 26, wherein the instructions, when executed, further configure the apparatus to:
  receive mapping information for the preferred color gamut settings, the mapping information comprising parameters of a mapping function and one or more high dynamic range (HDR) parameters from the source device, wherein the one or more HDR parameters comprise one or more of a minimum desired luminance of the content, a maximum desired luminance of the content, and one or more desired color gamut parameters; and
  adapt the content received by the source device using the information that includes the preferred color gamut settings and the one or more HDR parameters.

* * * * *